(12) United States Patent
Hirata

(10) Patent No.: US 9,230,078 B2
(45) Date of Patent: Jan. 5, 2016

(54) AUTHENTICATION SYSTEM, CONTROL METHOD THEREOF, SERVICE PROVISION DEVICE, AND STORAGE MEDIUM

(71) Applicant: CANON KABUSHIKI KAISHA, Tokyo (JP)

(72) Inventor: Kensuke Hirata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 14/294,611

(22) Filed: Jun. 3, 2014

(65) Prior Publication Data

US 2014/0373103 A1 Dec. 18, 2014

(30) Foreign Application Priority Data

Jun. 18, 2013 (JP) .................................. 2013-127916

(51) Int. Cl.
*G06F 17/30* (2006.01)
*G06F 21/31* (2013.01)

(52) U.S. Cl.
CPC ...................................... *G06F 21/31* (2013.01)

(58) Field of Classification Search
CPC ..... G06Q 20/10; G06Q 20/32; G06Q 20/322; G06Q 20/3227; G06Q 20/3229; G06Q 20/325; G06Q 20/347; G06Q 20/4014; G06Q 20/42; G06Q 20/425; G07F 7/10; G07F 7/1075
USPC ............................... 726/4; 713/166–168, 194
See application file for complete search history.

(56) References Cited

U.S. PATENT DOCUMENTS

| 7,272,728 | B2 * | 9/2007 | Pierson | ............... | H04L 63/0876 713/166 |
| 2002/0046353 | A1 * | 4/2002 | Kishimoto | .......... | H04L 63/0442 726/28 |
| 2014/0058825 | A1 * | 2/2014 | Raman | ................... | G06Q 30/02 705/14.42 |

FOREIGN PATENT DOCUMENTS

| JP | 2012-181844 | 9/2012 |
| JP | 2012-191270 | 10/2012 |

* cited by examiner

*Primary Examiner* — Dant Shaifer Harriman
*Assistant Examiner* — Abiy Getachew
(74) *Attorney, Agent, or Firm* — Fitzpatrick, Cella, Harper & Scinto

(57) ABSTRACT

An authentication system registers, in a service provision device, identification information for an information processing device that cooperates with the authentication system, associates the identification information for the information processing device with authorization information in accordance with an issuance of the authorization information corresponding to the information processing device, and saves them in the authorization service device, queries the authorization service device for the identification information for the information processing device associated with the authorization information in response to a request for obtaining the service and the issued authorization information from the information processing device, and provides, according to the request, the service with the information processing device in response to a correspondence between the identification information for the information processing device acquired as a result of the query and the identification information for the information processing device registered.

12 Claims, 19 Drawing Sheets

FIG. 2
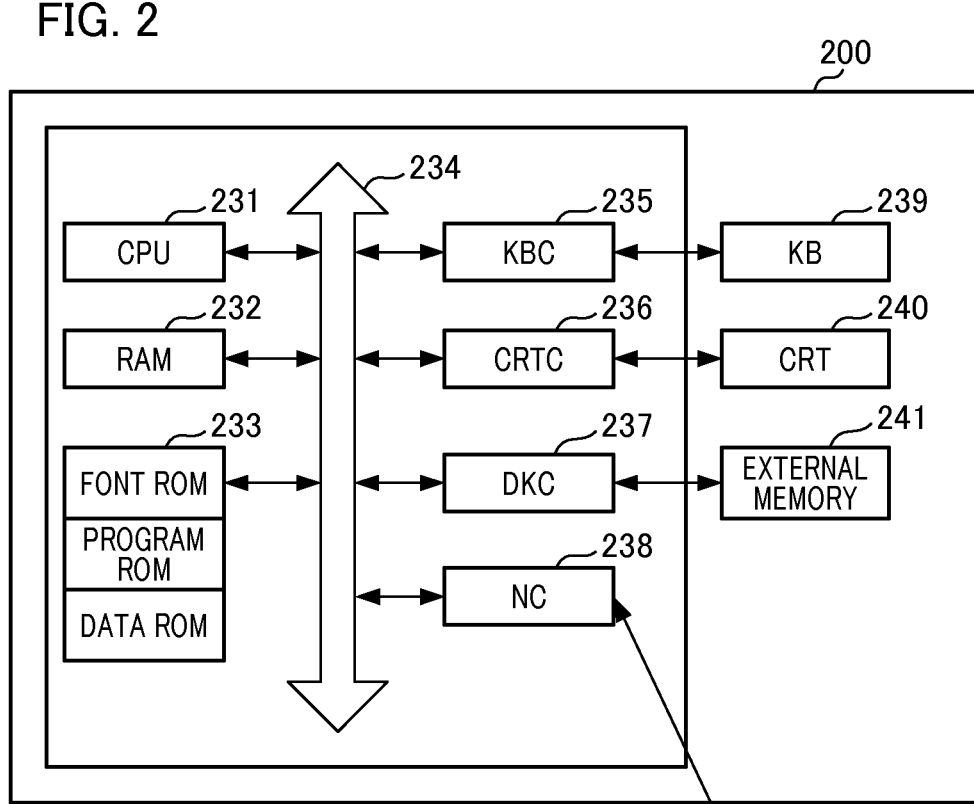
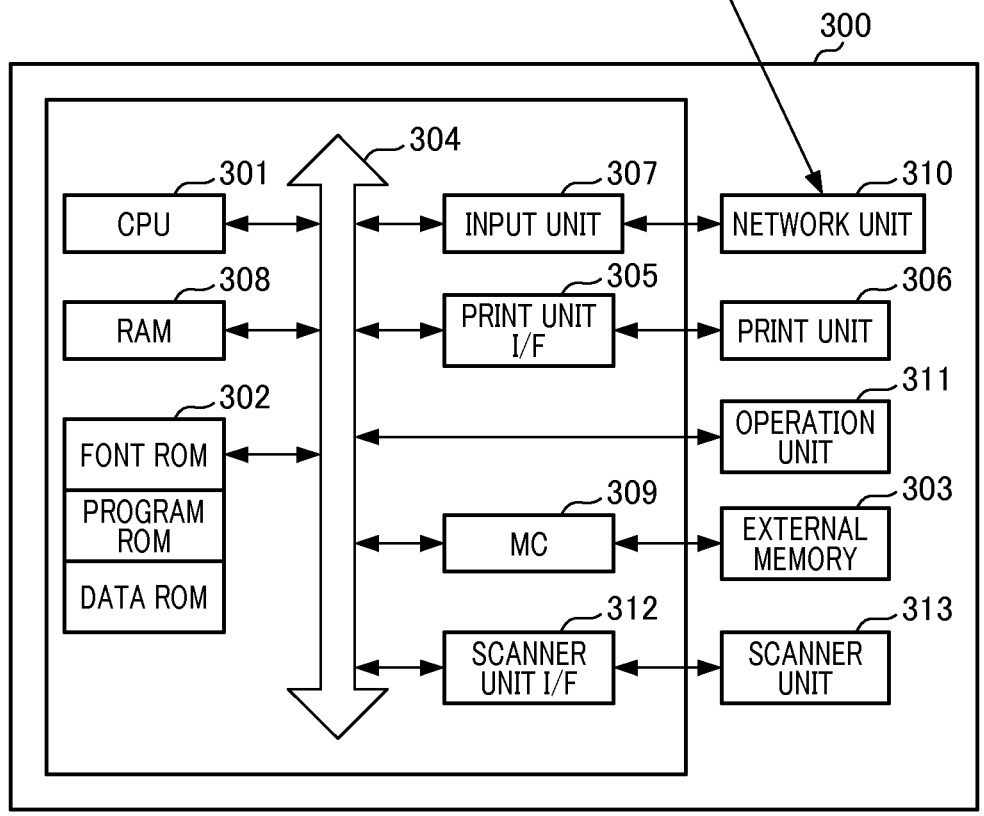

FIG. 4A

User management table 1300

| User ID 1301 | Password 1302 | User type 1303 |
|---|---|---|
| uid00000001 | ********** | User |
| dev00000001 | **************** | Device |
| uid00000002 | ******** | Administrator user |

FIG. 4B

Device management table 1400

| Device ID 1401 | Device name 1402 | Device explanation 1403 | Redirect URL 1404 | Serial number 1405 |
|---|---|---|---|---|
| dev00000001 | Printer model: PrinterModel_a | Printer name: Printer A<br>Installation location: Room 111 | https://dev01/redirect<br>https://127.0.0.1/redirect<br>https://192.168.0.1/redirect | AAA11111 |

FIG. 4C

Authorization token management table 1500

| Authorization token ID 1501 | Token type 1502 | Expiration date 1503 | Scope 1504 | Refresh token ID 1505 | Refresh time limit 1506 | Device ID 1507 | User ID 1508 |
|---|---|---|---|---|---|---|---|
| AT_000000 | Authorization code | 2013/09/30 11:00:00 | Authentication printing | | | dev00000001 | uid00000001 |
| AT_000001 | Parent token | 2013/12/30 12:00:00 | Authentication printing | RT_000001 | 2014/09/30 12:00:00 | dev00000001 | uid00000001 |
| AT_000002 | Child token | 2013/09/30 13:00:00 | Authentication printing | | | dev00000001 | uid00000001 |
| AT_000003 | Parent token | 2013/12/30 13:00:00 | Pull printing | RT_000002 | 2014/09/30 16:00:00 | dev00000002 | |
| AT_000004 | Child token | 2013/10/01 13:00:00 | Pull printing | | | dev00000002 | |
| | | | | | | | |

FIG. 5A

Device user management table 1600

| Device user ID 1601 | Password 1602 | IC card information 1603 |
|---|---|---|
| user001 | ******** | ****** |
| user002 | ******** | ****** |
| | | |

FIG. 5B

Device management table 1700

| Device ID 1701 | Device secret 1702 | End point URL 1703 | Device name 1704 | Device explanation 1705 | Redirect URL 1706 |
|---|---|---|---|---|---|
| dev00000001 | ************** | https://authz/oauth | Printer model: PrinterA | Printer name: Myprinter A Installation location: Room 111 | https://dev01/redirect https://127.0.0.1/redirect https://192.168.0.1/redirect |
| | | | | | |
| | | | | | |

FIG. 5C

Parent token management table (1800)

| Device user ID (1801) | Authorization token ID (1802) | Refresh token ID (1803) |
|---|---|---|
| user001 | AT_000001 | RT_000001 |
| user002 | AT_000003 | RT_000002 |
|  |  |  |

FIG. 5D

Printer information table (1900)

| Model name (1901) | URL (1902) | Serial number (1903) |
|---|---|---|
| PrinterModel_a | https://192.168.0.1/wsd | AAA11111 |

FIG. 5E

Print queue management table (2000)

| URL (2001) | Job ID (2002) | Printer ID (2003) | Device job ID (2004) |
|---|---|---|---|
| https://printserver.com | job000001 | pri000001 | 1 |
| https://printserver.com | job000002 | pri000001 | 2 |
|  |  |  |  |

FIG. 6A

Document management table 2100

| Document ID 2101 | Document name 2102 | User name 2103 | Data path 2104 |
|---|---|---|---|
| doc000001 | Document1 | user1 | C:/data/doc00001 |
| doc000002 | Document2 | user1 | C:/data/doc00002 |
| doc000003 | Document3 | user1 | C:/data/doc00003 |
| doc000004 | Document4 | user1 | C:/data/doc00004 |

FIG. 6B

Job management table 2200

| Job ID 2201 | Document ID 2202 | Status 2203 | Printer ID 2204 | Device job ID 2205 |
|---|---|---|---|---|
| job000001 | doc000001 | Printed | pri000001 | 1 |
| job000002 | doc000002 | Printing | pri000001 | 2 |
| job000003 | doc000003 | Printed | pri000002 | 1 |

FIG. 6C

My printer management table 2300

| My printer name 2301 | Printer ID 2302 | User name 2303 |
|---|---|---|
| My printer A | pri000001 | user1 |
| My printer B | pri000002 | user1 |

FIG. 6D

Printer management table 2400

| Printer ID 2401 | Printer name 2402 | Model name 2403 | URL 2404 | Serial number 2405 | Type 2406 |
|---|---|---|---|---|---|
| pri000001 | Printer A | PrinterModel_a | https://192.168.0.1/wsd | AAA11111 | |
| pri000002 | Printer B | PrinterModel_a | https://192.168.0.2/wsd | BBB22222 | |
| pri000003 | Printer C | PrinterModel_b | https://192.168.0.3/wsd | CCC33333 | |
| pri000004 | | PrinterModel_c | https://192.168.0.4/wsd | DDD44444 | Authentication printing |

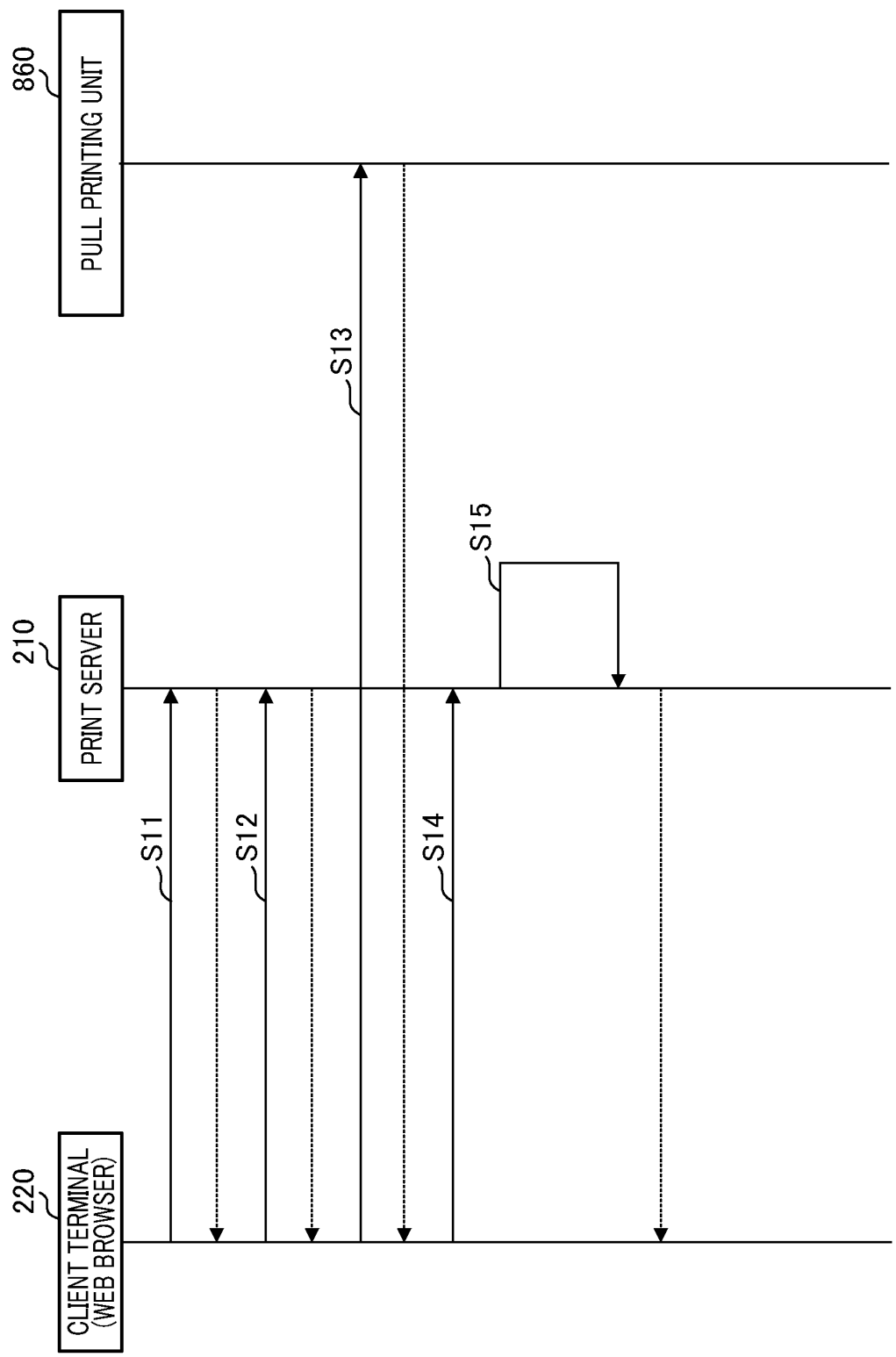

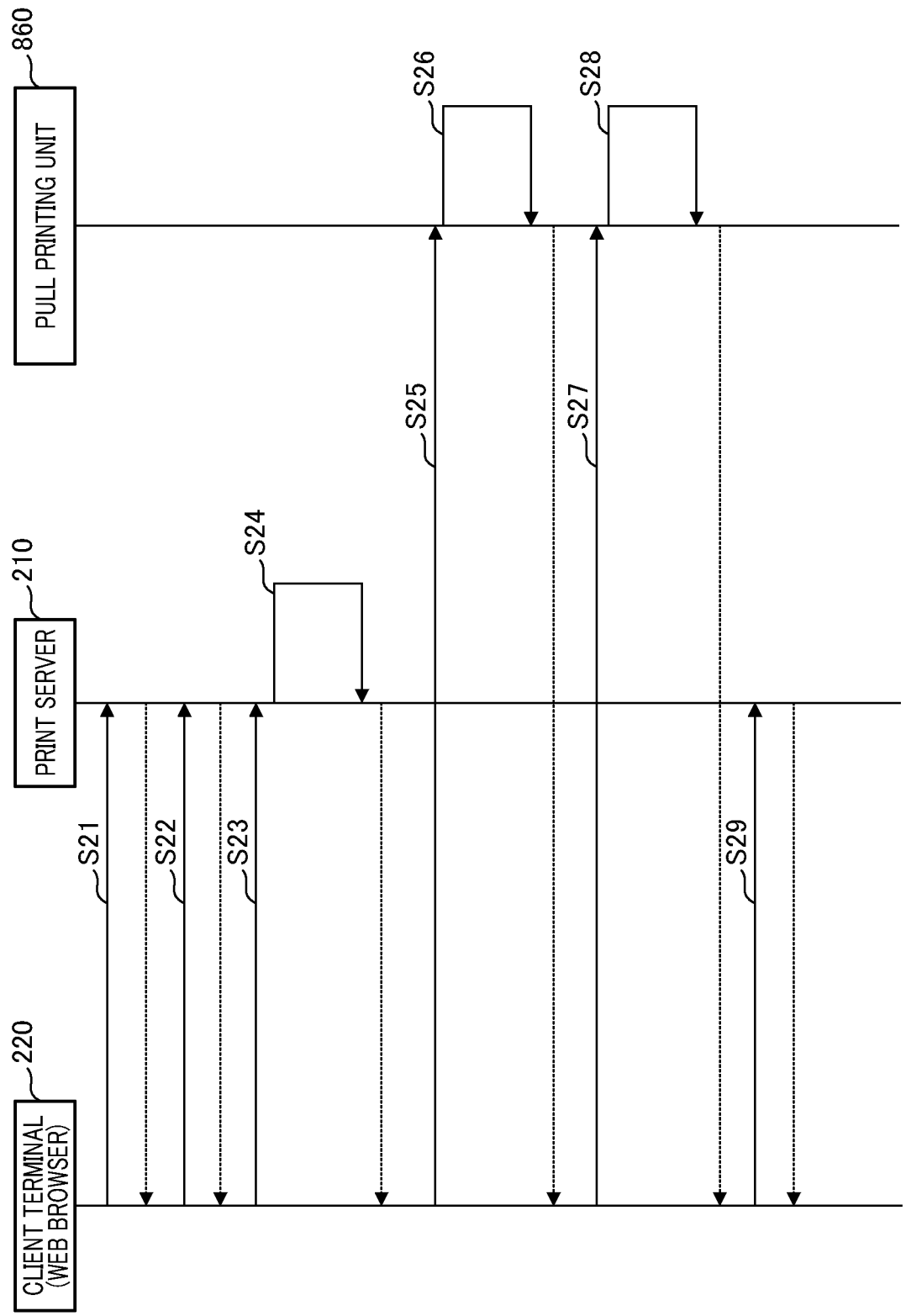

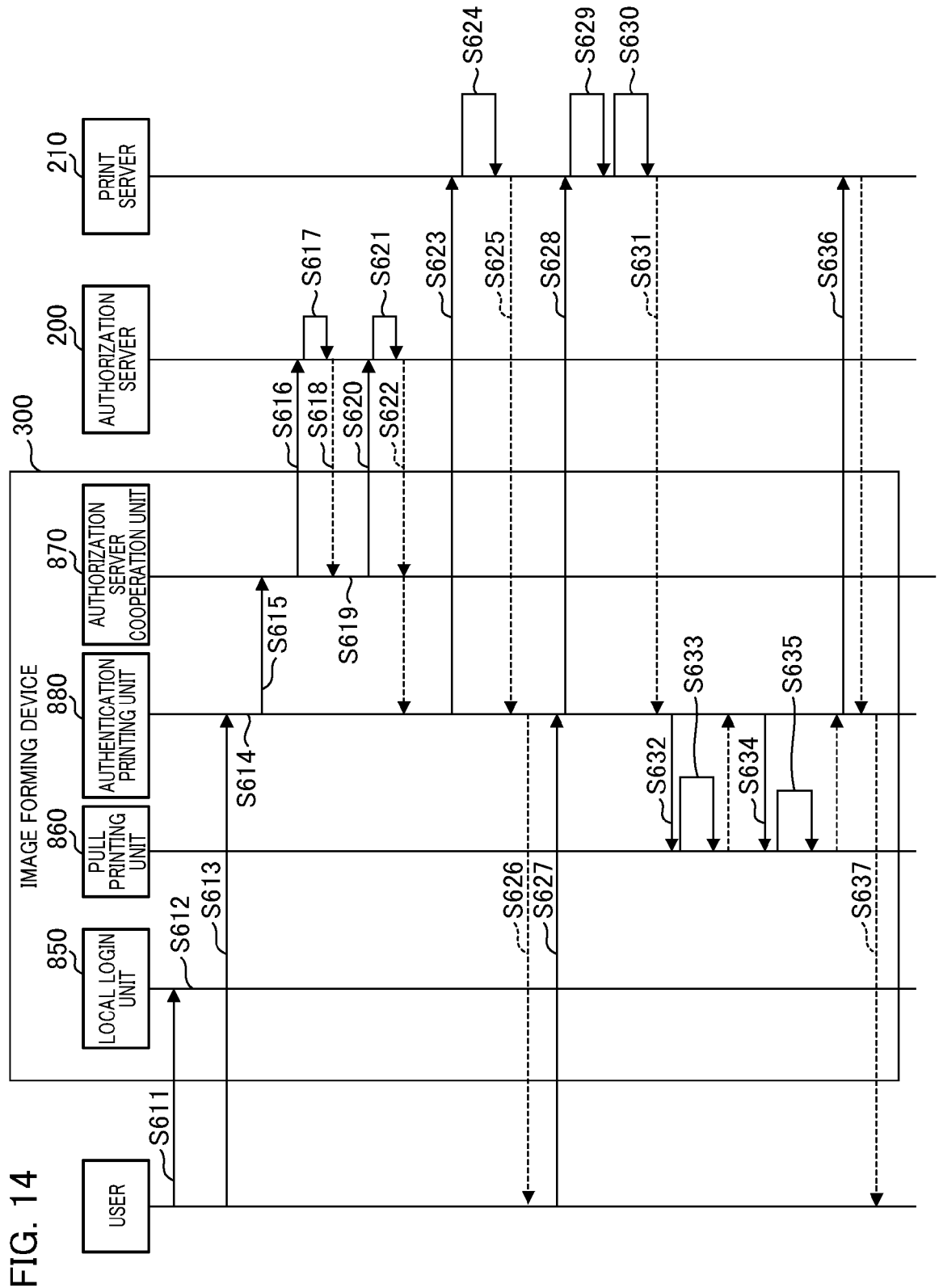

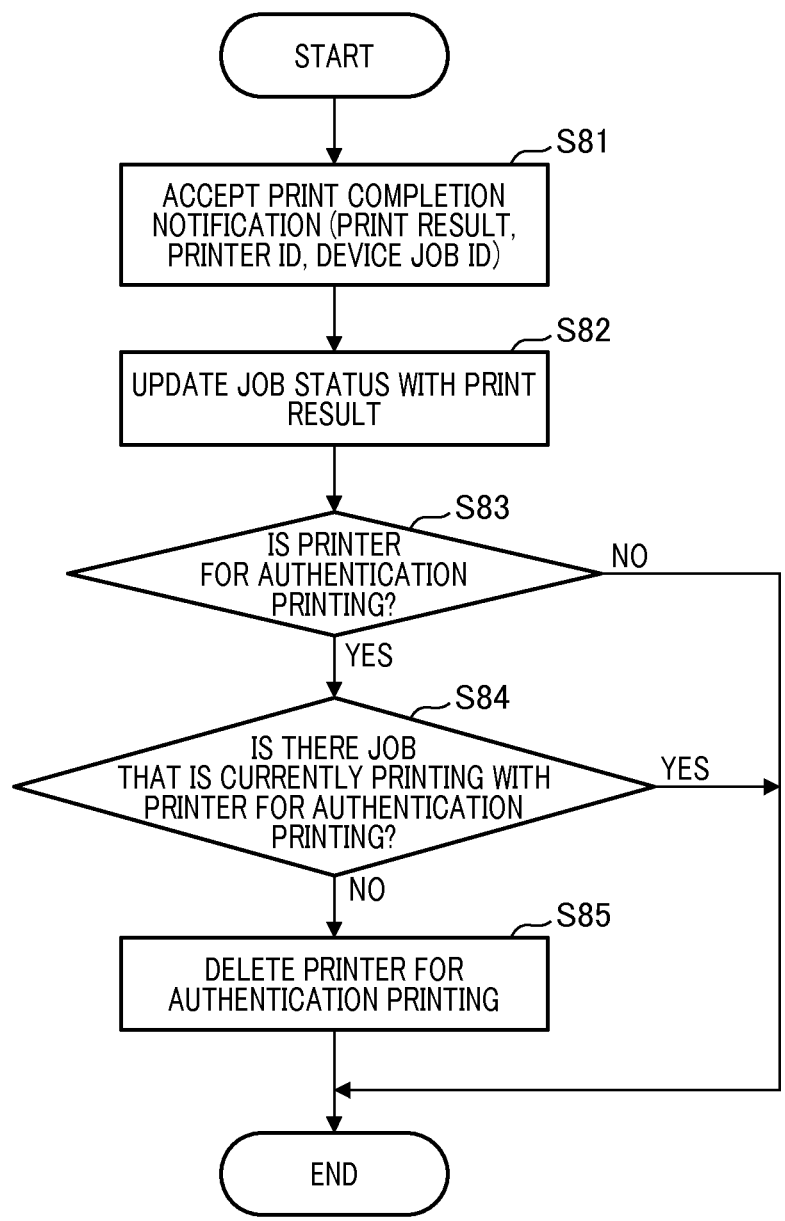

AUTHENTICATION SYSTEM, CONTROL METHOD THEREOF, SERVICE PROVISION DEVICE, AND STORAGE MEDIUM

BACKGROUND OF THE INVENTION

1. Field of the Invention

The present invention relates to an authentication system, a control method thereof, a service provision device, and a storage medium.

2. Description of the Related Art

A business that provides services by disclosing the services as a cloud service on Internet has been developed. The print server becomes to be required to provide functions as a print service on the Internet. Provision of services as the cloud service enables location of the print server on a large data center so that hardware management for each customer is eliminated. Also, this provides various advantages such as a simple way of supplementing resources depending on a load imposed on a server. By utilizing this function, there has been proposed a printing system enabling pull printing in which a printer acquires print data over the Internet so as to execute printing.

Up to now, accesses to the print server that has been operated on an Intranet are limited to the Intranet, and thus it was very difficult for a user to illegally access the print server. However, when the print server is disclosed as the cloud service on the Internet, a user can access the print server from anywhere in the world, and secure security is required. In recent years in which importance of security is increased, a standard protocol called "OAuth" for authorization cooperation has been developed and is being applied for communication between the cloud service and a client. In OAuth, information called "token" is utilized as information for proving an authority that is transferred from a user or a client. The cloud service prevents an illegal access by the client by verifying validity of the token notified by a client.

When the image forming device cooperates with the print server by using OAuth, a user transfers, to the image forming device, an authority for accessing a print job held by the print server. In this manner, the image forming device can downloads print data of the print job stored by the print server, and executes printing.

Also, when a plurality of users shares and uses the image forming device, the image forming device is required for queue control for print jobs of the plurality of users. In the case where the authority transfer to the image forming device is performed for each user, the image forming device retains the token for each queued print job.

Although the image forming device performs print processing by sequentially executing the queued print job, subsequent queued print jobs become a waiting state if printing is not executed due to paper out or the like. An expiration date is generally set to the token for preventing abuse, and the expiration date set to the token may be expired if printing is not executed for a long time. When the expiration date is expired, the image forming device cannot download print data from the print server. Since the image forming device cannot upload the token for the user authority, it is contemplated that the image forming device executes download of the print data from the print server by using not the user authority but the printer authority of the image forming device. The printer authority enables update of the token and print continuation by the image forming device even if the expiration date is expired.

However, when the image forming device downloads the print data using the token issued by the printer authority, printer information or user information is not transmitted to the print server. Hence, a malicious third party may download print data for other user using the token issued by the printer authority. As a result, information for other user is leaked, and security is not ensured.

Japanese Patent Laid-Open No. 2012-191270 discloses a system that specifies an image forming device in a secure manner by using a first common key for creating a token, and a second common key for identifying a device ID of the image forming device. However, there remains a large security risk causing an illegal access to all print data if the common keys are leaked. In a system disclosed in Japanese Patent Laid-Open No. 2012-181844, a server retains a device identifier by associating it with a user, and verifies the device identifier upon a login by the user to thereby prevent the illegal access. However, the illegal access is not prevented when the user does not perform the login.

SUMMARY OF THE INVENTION

An authentication system of the present invention prevents illegal data downloading by a mechanism in which only an image forming device that executes printing acquires print data from the print server by means of authentication.

An authentication system according to an embodiment of the present invention includes a service provision device that provides a service and an authorization service device that manages authorization information used for providing the service by the service provision device without requiring authentication information. The authentication system includes a registering unit configured to register, with the service provision device, identification information for information processing device that cooperates with the authentication system; a saving unit configured to associate the identification information for the information processing device with authorization information in accordance with an issuance of the authorization information corresponding to the information processing device, and save them in the authorization service device; a querying unit configured to query, the authorization service device, for the identification information for the information processing device associated with the authorization information in response to a request for obtaining the service and the issued authorization information from the information processing device; and a providing unit configured to provide the service with the information processing device in response to a correspondence between the identification information for the information processing device acquired as a result of the query by the query unit and the identification information for the information processing device registered by the registration unit.

Further features of the present invention will become apparent from the following description of exemplary embodiments (with reference to the attached drawings).

BRIEF DESCRIPTION OF THE DRAWINGS

FIG. 2 illustrates an example of a hardware configuration of each device.

FIG. 4A to FIG. 4C illustrate tables managed by an authorization server.

FIG. 5A to FIG. 5E illustrate table information managed by an image forming device.

FIG. 6A to FIG. 6D illustrate table information managed by a print server.

FIG. 7 is a sequence diagram for printer registration.

FIG. 8 is a print execution sequence diagram when a Web browser instructs printing.

FIG. 14 is a sequence diagram for authentication printing.

FIG. 16 is a deletion flow for authentication printing when a print completion notification is received.

DESCRIPTION OF THE EMBODIMENTS

First Embodiment

Figure 1:
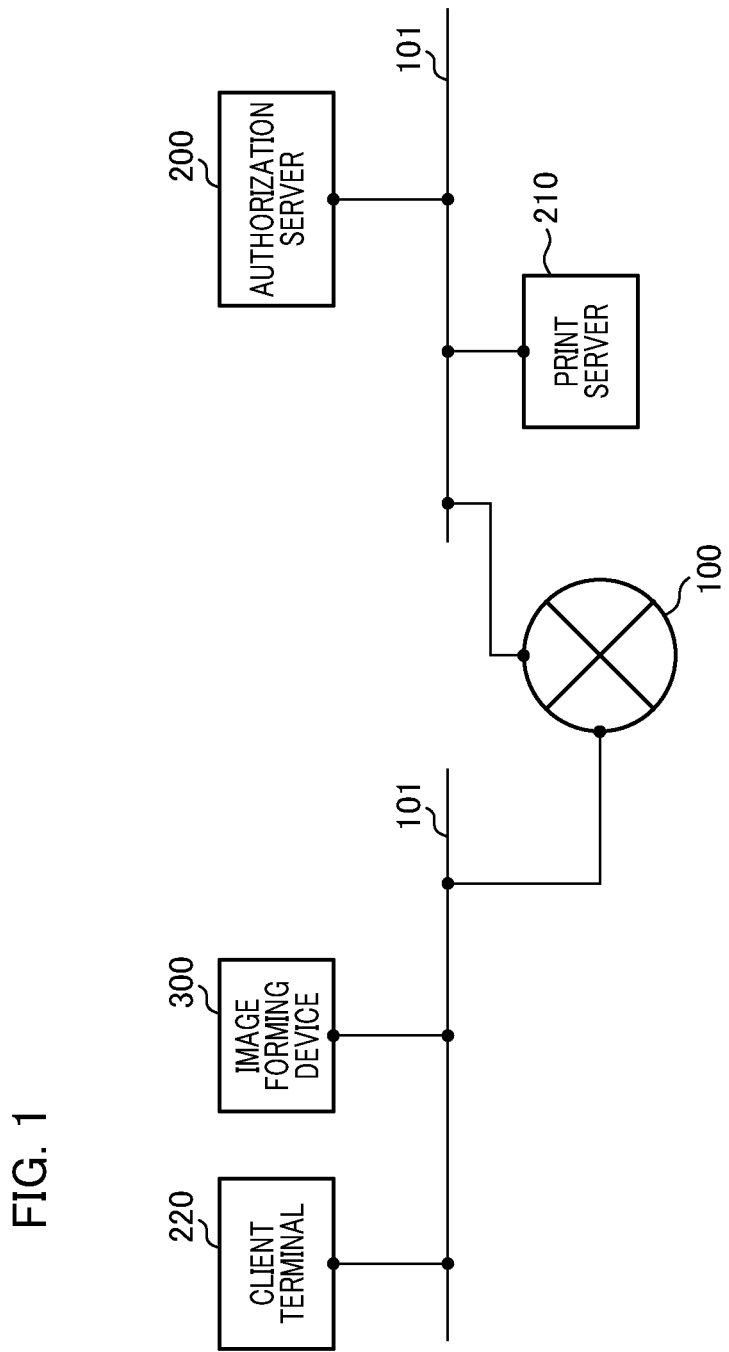
FIG. 1 illustrates an example of a system configuration according to an embodiment of the present invention.
Figure 3A:
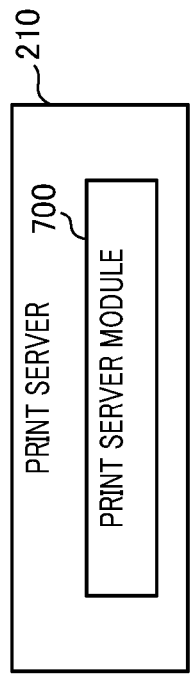
FIG. 3A to FIG. 3D illustrate examples of a software module configuration of each device.
Figure 3B:
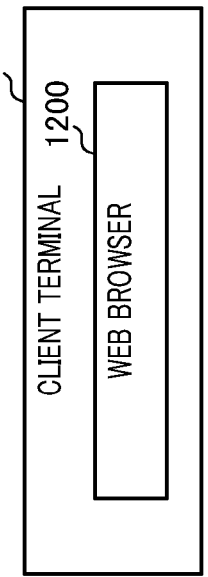
Figure 3C:
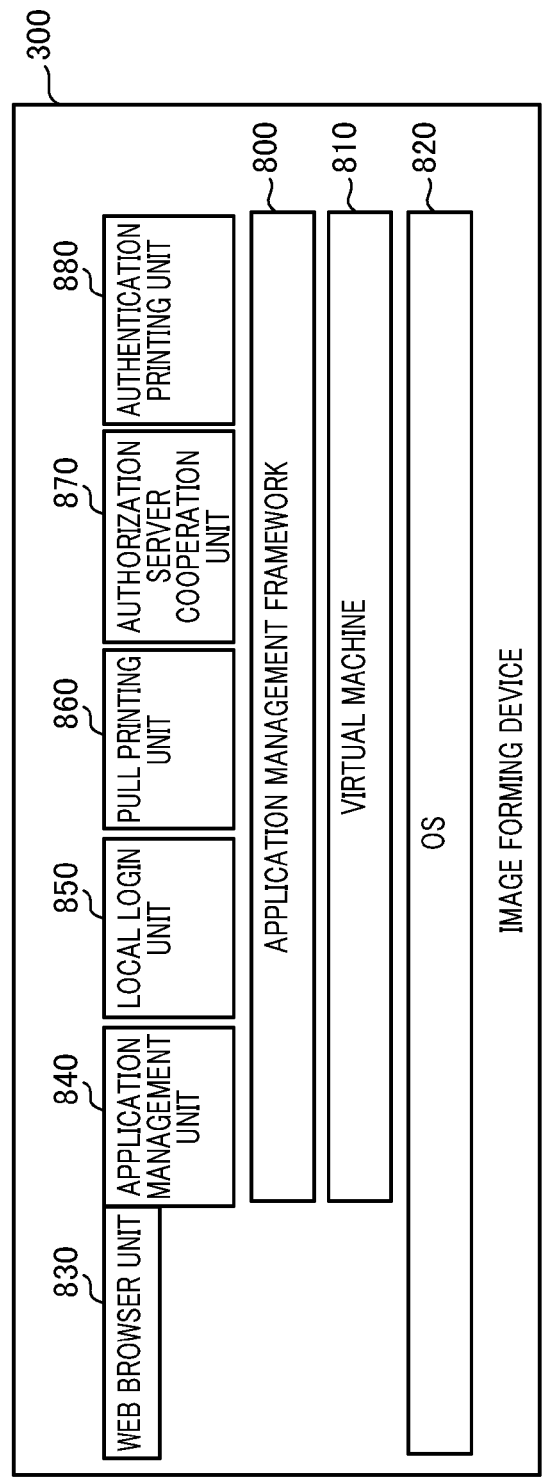
Figure 3D:
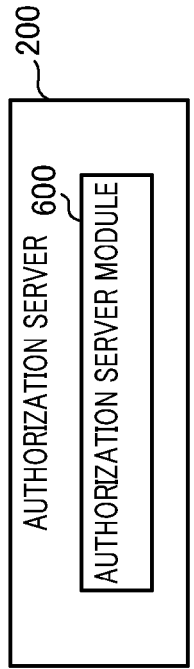

FIG. 1 is a diagram illustrating an example of a printing system according to the present embodiment. The printing system also functions as an authentication system that performs authentication using OAuth so as to prevent illegal downloading. The printing system includes an authorization server 200, a print server 210, a client terminal 220, and an image forming device 300. The client terminal 220 and the image forming device 300 are communicable with the authorization server 200 and the print server 210 via a WAN (Wide Area Network) 100. Assume a World Wide Web (WWW) system is established in the present embodiment. The client terminal 220 and the image forming device 300 are connected with each other via a LAN (Local Area Network) 101. The authorization server 200 and the print server 210 are also connected with each other via the LAN 101.

The authorization server 200 is an authorization service device that manages authorization information for realizing OAuth. The print server 210 is a service provision device that provides print data such as a document created by a user upon receiving a request from the client terminal 220 or the image forming device 300. The client terminal 220 is a user device that instructs printing and the like to the image forming device 300 upon obtaining a service from the print server 210. The image forming device 300 is an information processing device that acquires print data and the like upon receiving a request, and executes printing. Note that each of the authorization server 200, the print server 210, the client terminal 220, and the image forming device 300 may be configured on an individual LAN or the same LAN. The authorization server 200 and the print server 210 may be configured on the same server.

The printing system according to the present embodiment is realized on a system consisted of the server and the image forming device which have configurations shown in FIG. 2. FIG. 2 illustrates an aspect in which the authorization server 200 and the image forming device 300 are communicably connected with each other via the WAN 100 and the LAN 10. Firstly, a description will be given of a configuration of the authorization server 200. Assume that a hardware block diagram shown in FIG. 2 corresponds to a hardware block diagram of a general information processing device, and the hardware block diagram of the general information processing device can be applied to the authorization server 200 in the present embodiment. Although a description will be given of an example of the hardware configuration of the authorization server 200 with reference to FIG. 2, this configuration example is applied to the print server 210 and the client terminal 220.

As shown in FIG. 2, the authorization server 200 includes a CPU 231, a RAM 232, a ROM 233, a KBC 235, a CRTC 236, a DKC 237, an NC 238, a KB 239, a CRT 240, and an external memory 241. The CPU 231 to the NC 238 can receive/transmit data with each other using a system bus 234. The CPU (Central Processing Unit) 231 controls each block connected to the system bus 234. The CPU 231 also loads programs such as an OS and applications that are stored in the external memory 241 such as a program ROM of the ROM 233 or a hard disk (HD), and executes them. The ROM (Read Only Memory) 233 is a unit that stores various programs, such programs includes a font ROM, a program ROM, and a data ROM. The RAM (Random Access Memory) 232 functions as a main memory, a working area, and the like for the CPU 231. The OS is an abbreviation for "Operating System" that operates on a computer, and hereinafter called "OS". Processes in each sequence described below are realized by executing the programs above.

The keyboard controller (KBC) 235 controls a key input from a keyboard (KB) 239 or a pointing device (not shown). The CRT controller (CRTC) 236 controls display on the CRT display 240. The disk controller (DKC) 237 controls a data access to the external memory 241 such as the hard disk that stores various data. The network controller (NC) 238 executes communication control processing between the image forming device 300 and other devices that are connected via the WAN 100 or the LAN 101. Note that a subject on the hardware in the server is the CPU 231, and a subject on the software in the server is application programs stored in the external memory 241 in all descriptions below unless otherwise stated.

Next, a description will be given of an example of a hardware configuration of the image forming device 300. As shown in FIG. 2, the image forming device 300 includes a CPU 301, a RAM 308, a ROM 302, an input unit 307, a control unit I/F 305, and MC 309, and a scanner unit I/F 312. The image forming device 300 also includes a network unit 310, a print unit 306, an operation unit 311, an external memory 303, and a scanner unit 313. The CPU 301 controls each block connected to a system bus 304 based on control programs that are stored in the ROM 302 or the external memory 303. Image signals generated by the processing by the CPU 301 are output to the print unit (printer engine) 306 as output information via the print unit I/F 305. The CPU 301 is also communicable with the authorization server 200 via the input unit 307 and the network unit 310, and is capable of notifying the authorization server 200 of information in the image forming device 300 and the like.

Control programs for the CPU 301 and the like are stored in a program ROM in the ROM 302. Font data used when output information is generated and the like is stored in font ROM in the ROM 302. In the case of an image forming device having no external memory 303 such as the hard disk, information for receiving/transmitting from/to the image forming device and the like is stored in a data ROM in the ROM 302.

The RAM 308 functions as a main memory, a working area, and the like for the CPU 301, and is configured such that a memory capacity can be expanded with an option RAM that is connected to an expanded port (not shown). The RAM 308 is also used for an output information development area, an environment data storing area, an NVRAM, or the like.

The memory controller (MC) 309 controls an access to the external memory 303. The external memory 303 is connected to the image forming device 300, and stores font data, an emulation program, form data, and the like. The operation unit 311 is configured of a switch, an LED display apparatus, and the like for operation.

Note that a subject on the hardware is the CPU 301, and a subject on the software is application programs installed on the external memory 303 when the image forming device executes processing in all descriptions below unless otherwise stated.

FIG. 3A to FIG. 3D are diagrams illustrating examples of the respective software module configurations of the authorization server 200, the print server 210, the client terminal 220, and the image forming device 300 shown in FIG. 1. The authorization server 200 includes an authorization server module 600. The CPU 231 of the authorization server 200 executes the authorization server module 600 to thereby issue authorization information or implement authentication upon receiving an authentication request from the print server 210. Here, "authorization" refers to processing for authenticating about an access to the print server that is a request source, and permitting the access when the authentication indicates valid. Also, "authentication" refers to processing in which the print server that is a recipient of an authentication request confirms whether a sender of the request is the "identical" upon receiving the request from the authorization server. Although an input of authentication information such as a user ID and password is required for authentication, no input of authentication information is required for authorization because authentication is implemented using authorization information that has been already issued.

The print server 210 includes a print server module 700. The CPU 231 of the print server 210 executes the print server module 700 to thereby register the image forming device, request authentication to the authorization server 200, or the like. The client terminal 220 includes a Web browser 1200 that is a user agent for utilizing the WWW.

The image forming device 300 includes an application management framework 800, a virtual machine 810, an OS 820, a Web browser 830, an application management unit 840, a local login unit 850, and a pull printing unit 860. The image forming device 300 also includes an authorization server cooperation unit 870 and an authentication printing unit 880. The application management unit 840, the local login unit 850, the pull printing unit 860, the authorization server cooperation unit 870, and the authentication printing unit 880 are applications. The CPU 301 of the image forming device 300 executes the OS stored in the ROM 302 or the external memory 303 to thereby control the respective applications. Although a real time OS is generally used as the OS 820 shown in FIG. 3C, recently a general-purpose OS such as Linux (registered) may be used. Next, the virtual machine 810 is for example, a well-known Java (registered). This virtual machine 810 is a virtual application execution environment that operates an application controlled by the OS 820.

The application management framework 800 includes a function that manages a life cycle of each application to be managed that operates on the application execution environment provided by the virtual machine 810. The application management framework 800 also includes an I/F for controlling the life cycle of the each application, and an I/F publication function for intermediating a processing request between applications. Assume that "life cycle" indicates a state of the application such as installation, activation, abort, and uninstallation. In the present embodiment, OSGi (registered) defined in an OSGi (Open Services Gateway initiative) alliance is assumed as the application management framework 800.

The local login unit 850, the pull printing unit 860, the authorization server cooperation unit 870, and the authentication printing unit 880 operate in the application execution environment provided by the virtual machine 810. The life cycles of these applications are managed by the application management framework 800. The application management unit 840 is an application that accepts a request for installation of various applications, a start request, and the like from a user via the control I/F for life cycle management disclosed by the application management framework 800.

Here, the image forming device 300 may include, as a default, the authorization server cooperation unit 870, the authentication printing unit 880, the local login unit 850, and the pull printing unit 860. Otherwise, these applications may be installed later via the application management unit 840 and the application management framework 800. In addition, the image forming device 300 includes a Web browser 830 that is a user agent for utilizing WWW.

FIG. 4A, FIG. 4B, and FIG. 4C are data tables which the authorization server 200 stores in the external memory 241. Each data table shown in FIG. 4 to FIG. 4c may be configured to be stored not in the external memory 241 but in another server configured to be communicable via the LAN 101.

FIG. 4A is a user management table 1300. The user management table 1300 includes a user ID 1301, a password 1302, and a user type 1303. The authorization server 200 has a function that verifies a pair of information for the user ID 1301 and the password 1302, and generates authentication information (token) if the pair of information is valid to thereby authenticate a user or a client.

FIG. 4B is a device management table 1400. The device management table 1400 includes a device ID 1401, a device name 1402, a device explanation 1403, a redirect URL 1404, and a serial number 1405. The device ID 1401 is associated with the user ID 1301 in the user management table 1300, and the device ID 1401 and the user ID 1301 can be referred with each other. The device name 1402, the device explanation 1403 and the redirect URL 1404 are values used in an OAuth sequence described below. The serial number 1405 is a value that is registered when a device is the image forming device 300 and the image forming device can be uniquely identified with the value. Note that this table is assumed to manage a printer having a print function or a facsimile function, but the printer is not limited thereto. The table can manage any information processing device as long as the device is uniquely identified.

FIG. 4C is an authorization token table 1500. The authorization token table 1500 includes an authorization token ID 1501, a token type 1502, an expiration date 1503, a scope 1504, a refresh token ID 1505, a refresh time limit 1506, a device ID 1507, and a user ID 1508. The processing details about the authorization token table 1500 are given below.

FIG. 5A, FIG. 5B, FIG. 5C, FIG. 5D, and FIG. 5E are data tables which the image forming device 300 stores in the external memory 303. FIG. 5A is a device user management table 1600. The device user management table 1600 is configured to be referred or updated from the local login unit 850. In the present embodiment, although this table is described to be stored in the external memory 303 of the image forming device 300, the table may be configured to be stored in another server with which the image forming device 300 is communicable via the LAN 101.

The device user management table 1600 includes a device user ID 1601, a password 1602, and an IC card information 1603. The local login unit 850 creates a screen (not shown) for accepting a user ID and a password from a user using through an input screen of the image forming device 300. The local login unit 850 has a function that verifies whether the input pair of the user ID and the password matches the pair of the device user ID 1601 and the password 1602, and generates a login context containing information of the device user ID 1601 if the input pair matches to thereby authenticate each user.

Also, the local login unit 850 acquires IC card information from an IC card reader (not shown) connected to the image forming device 300, and verifies whether the IC card information matches information of the IC card information 1603. The local login unit 850 may include a function that authenticates each user by generating a login context containing corresponding information of the device user ID 1601 if the IC card information matches. Here, the login context is an object in which information of the device user ID 1601 of the authenticated user is set. For example, the login context may be configured so that attribute information of the user such as a domain to which the user belongs, information such as an e-mail address of the user, or the like is set.

FIG. 5B is a device management table 1700. The device management table 1700 is configured to be referred and updated from only the authorization server cooperation unit 870. The device management table 1700 includes a device ID 1701, a device secret 1702, an end point URL 1703, a device name 1704, a device explanation 1705, and a redirect URL 1706. Here, the device ID 1701 and the device secret 1702 respectively correspond to the user ID 1301 and the password 1302 issued in advance by the authorization server 200. In addition, the same data with the device ID 1401, the device name 1402, and the redirect URL 1404 in the device management table 1400 is stored in the device name 1704, the device explanation 1705, and the redirect URL 1706. The end point URL 1703 is a URL of an end point for OAuth which the authorization server discloses.

FIG. 5C is a parent token management table 1800. The parent token management table 1800 is configured to be referred and updated from only the authorization server cooperation unit 870. The parent token management table 1800 includes a device user ID 1801, an authorization token ID 1802, and a refresh token ID 1803. The processing details about the parent token management table 1800 are described below.

FIG. 5D is a printer information table 1900. The printer information table 1900 is configured to be referred and updated from all applications on the image forming device 300. The printer information table 1900 includes a model name 1901, a URL 1902, and a serial number 1903. The model name 1901 is a name capable of identifying a model of the image forming device 300. The URL 1902 is an end point by which the pull printing unit 860 accepts a print request. The serial number 1903 is allocated for each image forming device 300, and the image forming device 300 can be uniquely identified with a value of the serial number 1903.

FIG. 5E is a print queue management table 2000. The print queue management table 2000 is configured to be referred and updated from only the pull printing unit 860. The print queue management table 2000 includes a URL 2001, a job ID 2002, a printer ID 2003, and a device job ID 2004. The pull printing unit 860 registers the URL 2001, the job ID 2002 and the printer ID 2003 passed in response to a print request as print job information with the print queue management table 2000 in order which the print request is accepted. Upon registering the print job information with the print queue management table 2000, the pull printing unit 860 issues the device job ID 2004. The device job ID 2004 is a unique identifier for identifying the print job in the pull printing unit 860. The pull printing unit 860 executes printing in order which the print job is registered in print queue management table 2000.

FIG. 6A, FIG. 6B, FIG. 6C, and FIG. 6D are data tables which the print server 210 stores in the external memory 303. The data tables shown in FIG. 6 A to FIG. 6D may be configured to be stored not in the external memory 303 of the print server 210 but in another server configured to be communicable via the LAN 101.

FIG. 6A is a document management table 2100. The document management table 2100 includes a job ID 2101, a document name 2102, a user name 2103, and a data path 2104. Upon receiving a document, the print server 210 issues the job ID 2101 that can uniquely identify the document the job ID 2101, and saves document data in the data path 2104. Values that are designated upon receiving the document are saved in the document name 2102 and the user name 2103.

FIG. 6B is a job management table 2200. The job management table 2200 includes a job ID 2201, a document ID 2202, a status 2203, a printer ID 2204, and a device job ID 2205. Upon receiving a print request, the print server 210 issues the job ID 2201 that can uniquely identify the print job. Values that are designated upon receiving the document are saved in the document ID 2202, the printer ID 2204, and the device job ID 2205. The document ID 2202 is associated with the document ID 2101 in the document management table 2100, the document ID 2202 and the document ID 2101 can be referred with each other. The status 2203 indicates a state of the print job, and "printing queue", "printing", "printed", "error termination", or the like is stored. The print server 210 changes the status 2203 to "printing queue" upon receiving a print request, and changes the status 2203 to "printing" upon receiving a print data downloading request from the pull printing unit 860. The print server 210 finally changes the status 2203 to "printed" or "error termination" based on a print result notification from the pull printing unit 860.

FIG. 6C is a my printer management table 230. The my printer management table 2300 includes a my printer name 2301, a printer ID 2302, and a user name 2303. The user selects a printer from a printer list registered with the print server 210, and registers my printer. The my printer name 2301 is a name of my printer that is arbitrarily designated by the user. The printer ID 2302 is an ID that uniquely identifies a printer associated with my printer, and is associated with the printer ID 2401 of a printer management table 2400, and the printer ID 2302 and the printer ID 2401 can be referred with each other. The user name 2303 is a user name of the user that created my printer.

FIG. 6D is the printer management table 2400. The printer management table 2400 includes a printer ID 2401, a printer name 2402, a model name 2403, a URL 2404, a serial number 2405, and a type 2406. Upon receiving a printer registration request, the print server 210 issues the printer ID 2401 that can uniquely identify a printer. Values that are designated in a printer registration request are saved in the printer ID 2401, the printer name 2402, the model name 2403, the URL 2404, and the serial number 2405. The printer name 2402 is a name of a printer that is arbitrarily designated by the user. The model name 1901, the URL 1902, and the serial number 1903 in the printer information table 1900 retained by the image forming device 300 are saved in the model name 2403, the URL 2404, and the serial number 2405, respectively. "Authentication printing" is saved in the type 2406 in the case of a printer for authentication printing.

<Printer Registration of Image Forming Device 300>

An OAuth mechanism is applied for an authority transfer to the image forming device 300 in the present embodiment. The authorization server cooperation unit 870 on the image forming device 300 plays a roll of the authority transfer to the image forming device 300.

A description will be given of the OAuth mechanism. Firstly, an administrator user registers printer information with the authorization server 200. The administrator user registers a printer model, a printer name, an installation location, a redirect URL, and a serial number of the image forming device 300 with the authorization server 200 via the authorization server cooperation unit 870 when the image forming device 300 activates. The authorization server 200 saves printer information in the device management table 1400. The authorization server 200 saves the printer model in the device name 1402, and the printer name and the installation location in device explanation 1403.

Also, when the printer registration is performed, the authorization server 200 issues the user ID 1301 and the password 1302 that can uniquely identify the client, and saves them in the user management table 1300. The user type 1303 in the user management table 1300 includes a "device", a "user", an "administrator user", and indicates an authentication target. In the case of the printer registration processing, the "device" is stored in the user type 1303. The authorization server 200 also saves the issued user ID 1301 in the device ID 1401 in the device management table 1400. The authorization server cooperation unit 870 receives the device ID 1401 and the password 1602 as a printer registration result, and retains them in the device ID 1701 and the device secret 1702 in the device management table 1700, respectively. The connection end point to the authorization server 200 is retained in the end point URL 1703. The printer information used in the print registration is retained in the device name 1704, the device explanation 1705, and the redirect URL 1706.

<Authority Transfer to Image Forming Device 300>

In OAuth, information called "token" is used as information for proving an authority that was transferred from a user or a client. In particular, a token in the case where the user or the client transferred its authority to the image forming device 300 is called "parent token". The authority transfer to the image forming device by the user means a transfer from the user to the image forming device of an authority for accessing a server.

Also, in the case where multiple types of servers are used from the single image forming device 300, it is efficient in the case where, for example, the respective applications on the image forming device 300 can use the servers by one authority transfer. Hence, when the user authority is transferred to the application on the image forming device 300, the image forming device 300 transfers the user authority to the application instead of the user so that the number of authority transfers is reduced. This means that the user allows authority transfer to the application in addition to the image forming device 300 at the stage of transferring the authority to the image forming device 300.

However, when the parent token acquired by the image forming device 300 as a means for completing the authority transfer at one time is shared in the applications on the image forming device 300, all of the applications that share the parent token can access the server, which is not desirable. This reason is that when the application accesses the print server using the shared parent token, the print server cannot specify the application that is an access source, and thus cannot determine the availability. Hence, the individual application on the image forming device 300 uses a token that is issued by retransferring for each application while taking over information transferred to the parent token without directly using the parent token. That is, this token is application-dedicated authorization information. The token issued by retransferring for each parent token application is called "the child token".

In the present embodiment, the pull printing unit 860 transfers the printer authority of the pull printing unit 860 to the image forming device 300, and the image forming device 300 acquires a parent token. Further, the image forming device 300 acquires a child token using the parent token, and transfers the printer authority to the pull printing unit 860 again.

<Printer Registration with Print Server>

FIG. 7 is a sequence in which a user who has an administrator authority on a Web browser of the client terminal registers a printer with the print server 210. Assume that the administrator user has completed user authentication on the authorization server 200 using the Web browser 1200 of the client terminal 220. In the connection between the Web browser 1200 and the print server 210, an authenticated state is retained with authentication information issued by the authorization server 200 upon user authentication. The print server 210 can acquire the authentication information added to a request from the Web browser 1200 so as to distinguish a login user. Also, only the user who has the administrator authority can execute printer registration. Specifically, upon accepting a request for printer registration (the processing in S12 and S14 described below), the print server 210 permits an access of the user type 1303 indicating "administrator user".

Figure 9A:
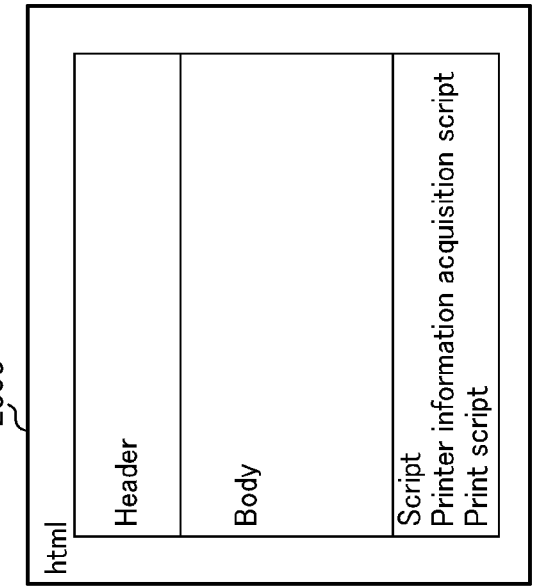
FIG. 9A to FIG. 9D are screen examples transmitted from the print server and displayed.
Figure 9B:
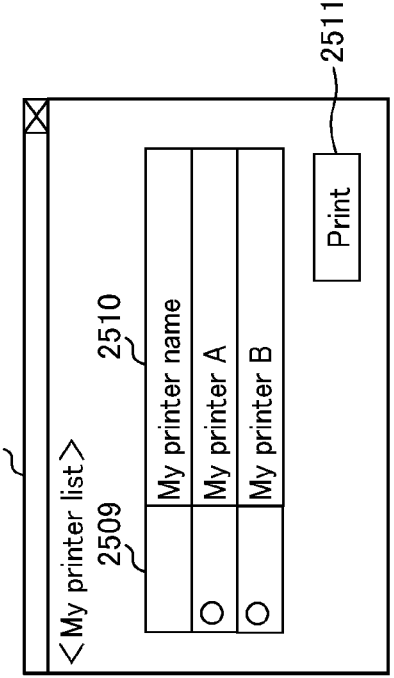

Firstly, upon accepting a printer registration screen from the Web browser 1200 (S11), the print server 210 returns a printer registration screen 2500 shown in FIG. 9A. The printer registration screen 2500 includes a printer name and an IP address inputting column 2501, and a printer registration button 2502. At the timing when the printer registration button 2502 is pressed by the user, a printer registration request is made to the print server 210 taking a printer name and an IP address input to the printer name and the IP address inputting column 2501 as parameters (S12). Upon accepting the printer registration request, the print server 210 generates a script screen including a script (including the print server URL, the job ID, and the printer ID) shown in FIG. 9B, and passes the script to the Web browser 1200. The generated script is a printer information acquisition script. The printer information acquisition script is a program executed on the Web browser 1200, and configured such that the processing in S13 and S14 described below is executed on the Web browser.

In S13, the Web browser 1200 makes a printer information acquisition request to the pull printing unit 860 using the printer information acquisition script so as to acquire printer information (S13). Upon accepting printer information acquisition request, the pull printing unit 860 passes, to the Web browser 1200, the model name 1901, the URL 1902, and the serial number 1903 in the printer information table 1900 as the printer information. Next, the Web browser 1200 transmits the acquired printer information to the print server 210 using the printer information acquisition script (S14). The print server 210 saves, in the printer management table 2400, the received model name, the URL and the serial number, and the printer name acquired in the printer registration request in S12 (S15). Then, the print server 210 issues the printer ID 2401 upon the printer registration and saves it. When the printer registration has been successfully made, the print server 210 passes a printer registration success screen (not shown) to the Web browser 1200.

<My Printer Registration on Print Server>

A user can register my printer with the print server 210. The user registers my printer using a my printer registration screen (not shown) provided by the print server 210. In the my printer registration screen, a user who has the administrator authority can select one printer from the printer management table 2400 and input a my printer name. The print server 210 saves the input my printer name, the printer ID 2401 of the selected printer, and a user name of a login user, respectively in the my printer management table 2300.

There is a risk of leaking user information when a user executes printing using an illegally-registered printer (my printer). Thus, by providing a mechanism in which the printer registration with the print server 210 is limited to the user who has the administrator authority, registration of an illegal printer by a malicious user is prevented.

<Printing from Web Browser>

FIG. 8 is a sequence until a user selects a document on the Web browser of the client terminal 220, and makes a print request to the pull printing unit 860. Assume that user authentication has been completed on the authorization server 200 using the Web browser 1200, and an authenticated state is retained between the Web browser 1200 and the print server 210 by authentication information issued by the authorization server 200 upon user authentication. The print server 210 can acquire the authentication information added to a request from the Web browser, and distinguish a login user.

Figure 9C:
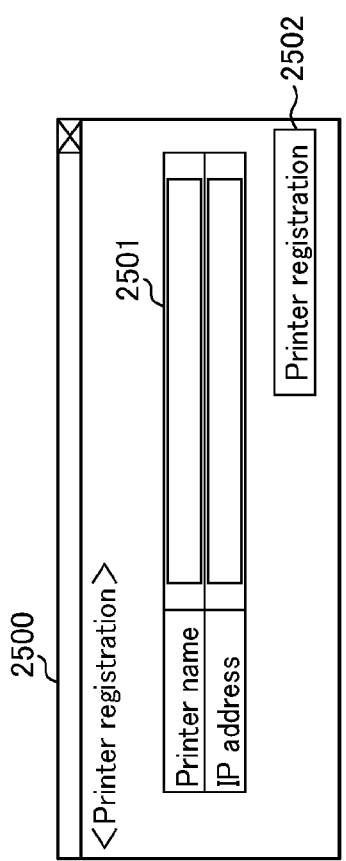

Firstly, upon accepting a document list screen acquisition request, the print server 210 acquires document information of a login user from the document management table 2100 (S21). The print server 210 generates a document list screen 2504 shown in FIG. 9C, and passes it to the Web browser. The document list screen 2504 shown in FIG. 9C is a screen for selecting a document to be printed, and includes a document selection check box 2505, a document name 2506, and print button 2507. The document name 2506 corresponds to the document name 2102 in the document management table 2100, and the corresponding document ID 2101 is retained in the document list screen 2504.

At the timing when the print button 2507 is pressed by the user, a document ID of the document selected in the document selection check box 2505 is transmitted to the print server 210 (a print request is made) (S22). In S22, the print server 210 that has received the print request acquires my printer information associated with the user name of the login user from the my printer management table 2300, generates a my printer list screen 2508 shown in FIG. 9D, and passes it to the Web browser 1200.

Figure 9D:
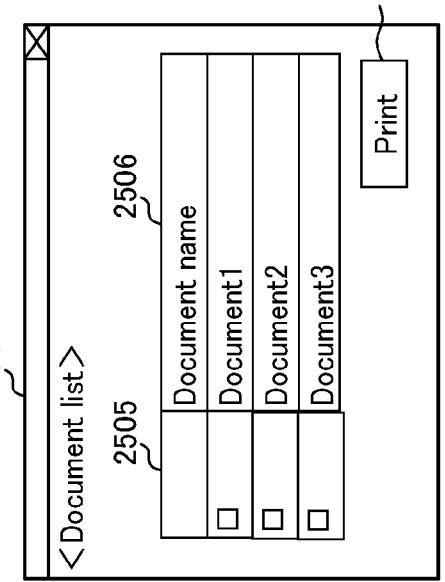

The my printer list screen 2508 shown in FIG. 9D includes a my printer selection radio button 2509, a my printer name 2510, and a print button 2511. The my printer name 2510 corresponds to the my printer name 2301 in the my printer management table 2300, and the corresponding printer ID 2302 is retained in the my printer list screen 2508. At the timing when the print button 2511 is pressed by the user, a printer ID of the my printer selected in the my printer selection radio button 2509 is transmitted to the print server 210 (a print request is made) (S23). Since the user designates the printer registered by the user who has the administrator authority and executes printing, the print request to an illegal printer can be prevented.

In S24, the print server 210 registers a print job including a job ID, the document ID, and the printer ID in the job management table 2200. The print server 210 issues the job ID 2201 upon registering the print job, and registers it. The document ID 2202 is the document ID reported in S22, the printer ID 2204 is the printer ID notified in S23. The print server 210 set the status 2203 to "printing queue". Next, the print server 210 generates a print script screen including a script (including the URL of the print server, the job ID, and the print ID) shown in FIG. 9B, and passes it to the Web browser 1200. The generated script is a script for instructing printing. The print script is a program executed on the Web browser 1200, and configured such that the processing in S25, S27, and S29 described below is executed on the Web browser 1200.

Firstly, in S25, the Web browser 1200 makes an event registration request to the pull printing unit 860 using the print script. In the event registration request, a URL of the print server 210 and a printer ID are designated. The pull printing unit 860 that has accepted the event registration request sets the print server URL and the printer ID in an event notification destination (S26). At this time, the pull printing unit 860 may set the event notification destination in the URL 2001 and the printer ID 2003 in the print queue management table 2000, or may manage it in another table. When the event notification destination has been set, the pull printing unit 860 passes a response indicating setting completion to the Web browser 1200.

Next, in S27, the Web browser 1200 makes a print request to the pull printing unit 860 using the print script. In the print request, the URL of the print server 210, the job ID, and the printer ID are designated for acquiring print data. The job ID is the job ID 2201 generated in S24 and the printer ID is the printer ID 2302 designated in S23, which are designated in the print request. The pull printing unit 860 that has accepted the print request adds print request information in the print queue management table 2000 (S28). The pull printing unit 860 saves the print service URL, the job ID, and the printer ID added to the print request in the URL 2001, the job ID 2002, and the printer ID 2003, respectively. In addition, the pull printing unit 860 generates the device job ID 2004, and saves it. The pull printing unit 860 passes the generated device job ID 2004 to the Web browser 1200 as a response of the print request.

In S29, the Web browser 1200 notifies the print server 210 about a device job ID using the print script. The print server 210 retains the received device job ID in the device job ID 2205 in the job management table 2200. At this time, the print server 210 updates the setting of the status 2203 in the job management table 2200 from "printing queue" to "printing". Then, the print server 210 passes the document list screen similar to the screen in S21 to the Web browser 1200. In another embodiment, the print server 210 may transmit a screen representing "now printing" to the Web browser 1200.

The aforementioned processing is the sequence when the print request is made to the pull printing unit 860 using the Web browser. Although the print request (in S22 and S27) is made with only one document ID in this embodiment, a plurality of requests may be made depending on the selection number when a plurality of documents is selected on the document list screen 2504.

<Pull Printing>

Figure 10:
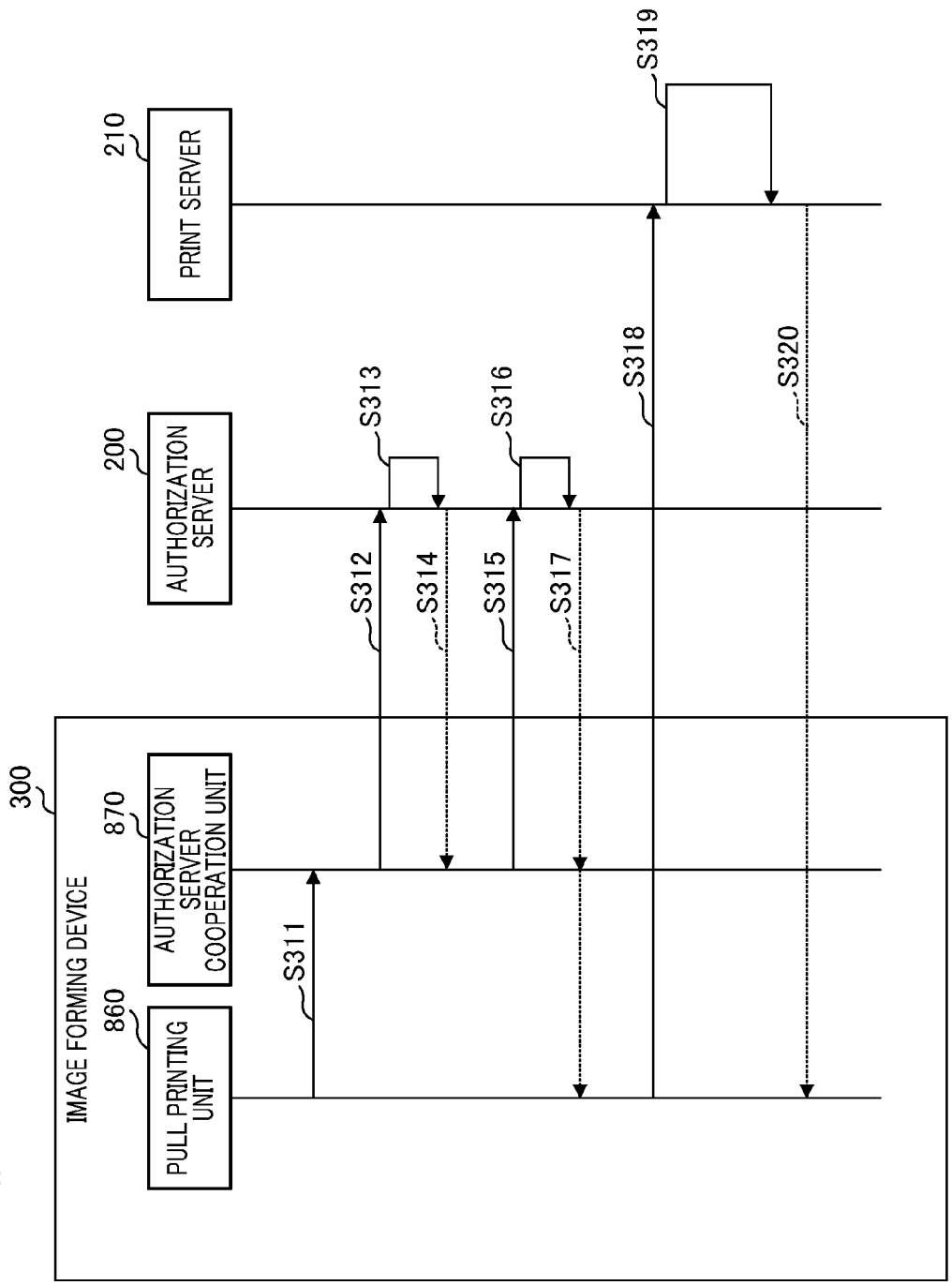
FIG. 10 is a sequence diagram for pull printing.

FIG. 10 is a sequence explaining the processing in which the image forming device 300 acquires a token from the authorization server 200 for acquiring print data, and acquires the print data using the pertinent token. In this specification, it is assumed that printing in which the image forming device acquires the print data due to an instruction from the Web browser 1200 and executes printing is called "pull printing". The pull printing unit 860 acquires a leading print job when one or more print jobs are registered in the print queue management table 2000, and starts print processing. The pull printing unit 860 executes a print job one job at a time in registration order among the print queue management table 2000.

Firstly, in S311, the pull printing unit 860 makes a token acquisition request to the authorization server cooperation unit 870 by designating a scope of "pull printing". The authorization server cooperation unit 870 makes a parent token acquisition request to the authorization server 200 taking the scope received in S311, and the device ID 1701 and the device secret 1702 in the device management table 1700 as a parameter (S312).

The authorization server 200 performs authentication using the user management table 1300, and the device ID and the device secret received in the parent the token acquisition request. The authorization server 200 determines that the authentication is successful when a pair of the device ID and the device secret exist in the user management table 1300, and the user type indicates a device. After the authentication has been successfully made, the authorization server 200 registers the scope (pull printing) and the device ID received in the parent token acquisition request with the scope 1504 and the device ID 1507 in the authorization token table 1500, respectively.

Here, the authorization server 200 issues/saves the authorization token ID 1501 taking the token type 1502 as "parent token" as well as saving an expiration date (S313). Although any expiration date may be set, the authorization server 200 sets the expiration date to three months after accepting the parent token acquisition request in the present embodiment. The authorization server 200 passes the generated parent token (the authorization token ID 1501) to the authorization server cooperation unit 870 as a response (S314).

Next, the authorization server cooperation unit 870 makes a child token acquisition request to the authorization server 200 using the received parent token (S315). The authorization server 200 searches for the authorization token ID 1501 in the authorization token table 1500 that is consistent with the parent token received in the child token acquisition request, and generates a child token based on record information of the parent token. The authorization token ID 1501 for the child token is newly issued/saved by the authorization server 200, and the child token is saved in the token type 1502 and the device ID 1507 of the parent token is saved in the device ID 1507 of the child token (S316). Although any expiration date for the child token may be set, the authorization server 200 sets the expiration date to 24 hours after accepting the child token acquisition request in the present embodiment. With the processing above, the authorization server 200 can manage authorization information by associating it with identification information for the image forming device 300 after issuing the authorization information.

The authorization server 200 passes the generated child token (the authorization token ID 1501) to the authorization server cooperation unit 870 as a response, and further the authorization server cooperation unit 870 passes it to the pull printing unit 860 (S317). The pull printing unit 860 accesses the URL 2001 (the print server 210) in the print queue management table 2000 and makes a print data acquisition request (S318). At this time, the pull printing unit 860 adds the child token, the job ID 2002, and the printer ID 2003 acquired in S317 to the print data acquisition request. In other words, the pull printing unit 860 acquires authorization information from the authorization server 200 when accepting, from a client device, a request for obtaining a service, and transmits the pertinent authorization information and a request for obtaining the service to the print server 210. The print server 210 performs request verification when accepting the print data acquisition request (S319). The details of the request verification are described below with respect to FIG. 11. When the request verification has been successfully made, the print server 210 passes print data having the job ID 2201 included in the data acquisition request to the pull printing unit 860 (S320), and then the pull printing unit 860 executes printing. With the processing above, the print server 210 can specify an application that is an access source, and determine whether the application can use the print server 210.

<Verification for Print Data Acquisition Request>

Figure 11:
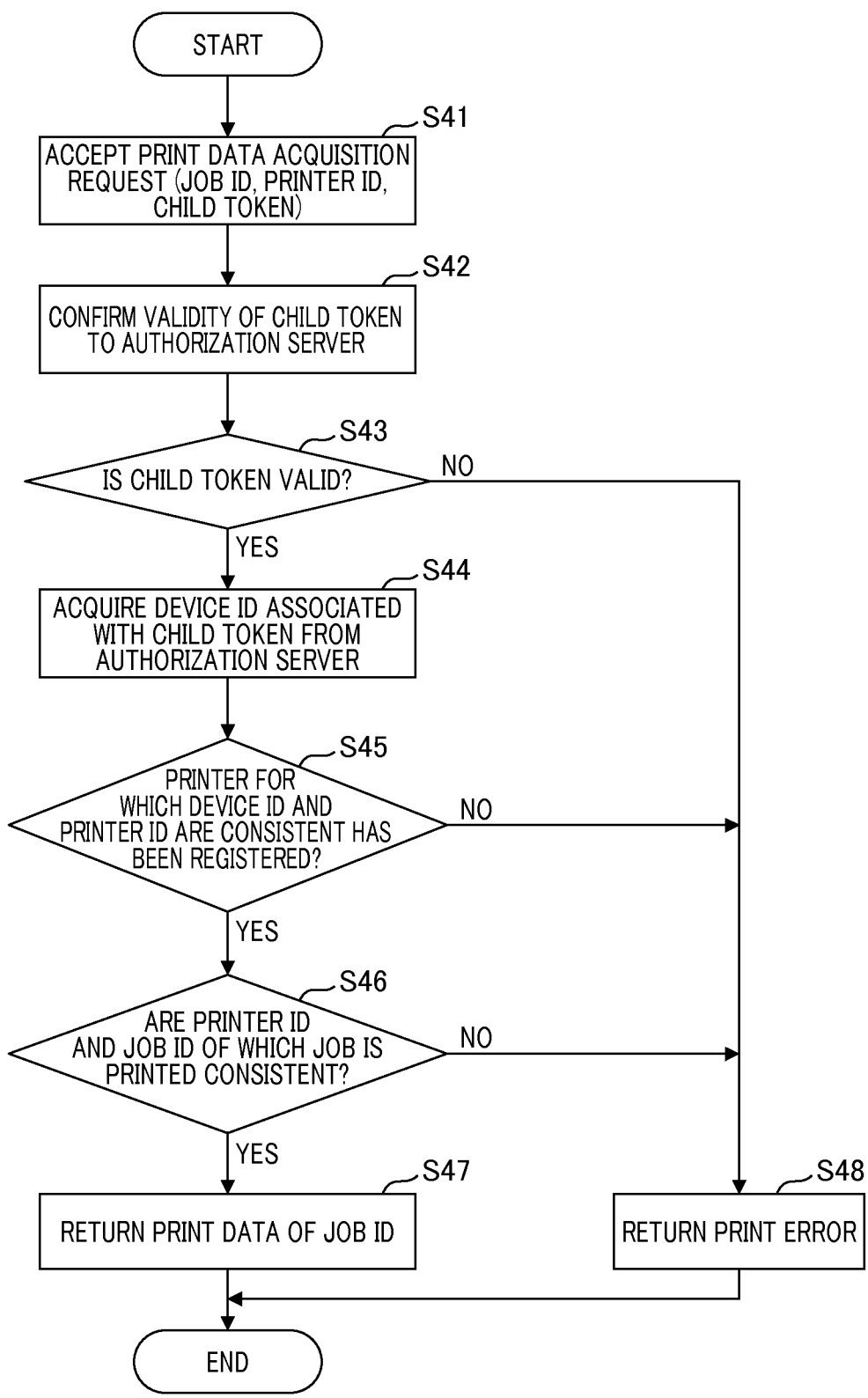
FIG. 11 is an authorization token confirming flow when a print data acquisition request is made.

FIG. 11 is a processing flow when the print server 210 accepts the print data acquisition request (S318) from the pull printing unit 860 and performs verification for the print data acquisition request.

Upon accepting the print data acquisition request from the pull printing unit 860 (S41), the print server 210 queries the authorization server 200 to confirm the validity of the child token included in the print data acquisition request (S42). The authorization server 200 verifies whether the authorization token ID 1501 that is consistent with the child token exists in the authorization token table 1500, and a current time is within the expiration date 1503, and passes the verification result to the print server 210. When the verification result from the authorization server 200 obtained by the query indicates invalid, the print server 210 passes a print error to the pull printing unit 860 (S43 and S47). When the verification result from the authorization server 200 obtained by the query indicates a valid result, the print server 210 request the authorization server 200 to acquire a scope and a serial number associated with the child token in S44. The authorization server 200 passes the scope of the authorization token ID 1501 corresponding to the authorization token ID associated with the child token, and the serial number 1405 associated with the issued device ID (1401, 1507) to the print server 210.

The print server 210 confirms that the scope acquired from the authorization server 200 is "pull printing". The print server 210 also confirms whether a printer having a serial number corresponding to the serial number acquired from the authorization server 200, and a printer ID corresponding to the printer ID acquired from the image forming device 300 in the print data acquisition request exists in the printer management table 2400 (S45). When the pertinent printer is not registered, the print server 210 passes a print error to the pull printing unit 860 (S45 and S48).

When the pertinent printer is registered, the print server 210 confirms whether the job ID and the printer ID passed via the print data acquisition request is consistent with the job ID 2201 and the printer ID 2204 in the job management table 2200 (S46). When the job ID and the printer ID are not consistent with the job ID 2201 and the printer ID 2204 in S46, the print server 210 passes a print error to the pull printing unit 860 (S46 and S48). When the job ID and the printer ID are consistent with the job ID 2201 and the printer ID 2204 in S46, the print server 210 passes print data having the job ID 2201 to the pull printing unit 860 (S46 and S47). With the processing above, the request for obtaining the service and the authorization information issued are transmitted to the print server 210, the query for identification information for the image forming device is executed. Then, the print server 210 can provide a service to the image forming device when the identification information for the image forming device acquired as a result of the query is consistent with the identification information for the registered image forming device.

As described above, according to the authentication system of the present invention, illegal downloading can be prevented by providing a mechanism in which only the image forming device that executes printing acquires print data from the print service by authentication. As described above, the user makes the print request by designating my printer created from the reliable printer registered by the user who has the administrator authority. The print server 210 that has accepted the print request verifies consistency between the serial number of the reliable printer and the serial number associated with the child token issued by the authority transfer in the verification for the print data acquisition request. The verification for the print data acquisition request can prevent transmission of print data to a printer other than the printer to which the print request is made by the user. Although the example above has been explained with respect to the print server and the image forming device that executes printing in the present embodiment, the mechanism in the present embodiment is applicable to a server that provides services other than the print service, or an information processing device other than the image forming device.

Second Embodiment

A system configuration, a hardware configuration and software modules, and a table configuration managed in the authorization server, a table configuration managed in the image forming device, and a table configuration managed in the print server in a second embodiment are the same as those in the first embodiment. The same processing of <the printer registration of the image forming device 300>, <the authority transfer to the image forming device 300>, <the printer registration with the print server> and <the pull printing>, which have been explained in the first embodiment, is applied to the second embodiment.

<Authority Transfer of User in Authentication Printing>

In the second embodiment, a user transfers an authority for acquiring data from the print server 210 or making a print request to the print server 210 to the authentication printing unit 880 on the image forming device 300, to thereby execute authentication printing. In this specification, printing based on authentication with a local login is called "authentication printing". A description will be given of a sequence for parent token acquisition using the authority transfer by a user in the second embodiment with reference to FIG. 12 and FIG. 13. This sequence is an operation performed just one time with the Web browser 830 of the image forming device 300.

Figure 12:
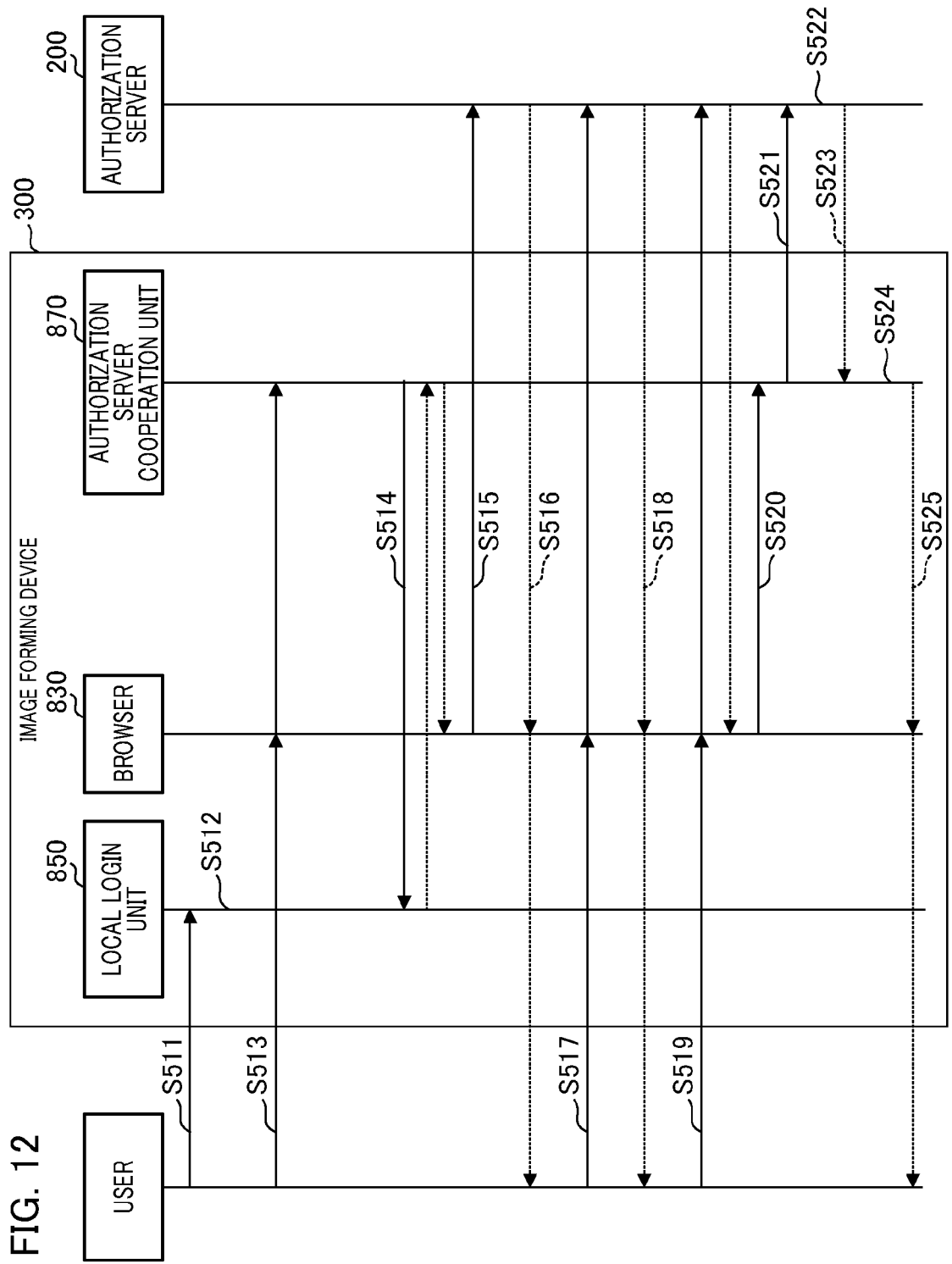
FIG. 12 is a user authorization sequence diagram.

As shown in FIG. 12, firstly, the user logs into the image forming device 300 with the input screen of the image forming device 300 and provided by the local login unit 850 (S511). If a user whose user ID is user001 logs into the image forming device 300, the local login unit 850 generates a login context containing the user001 (S512).

Figure 13A:
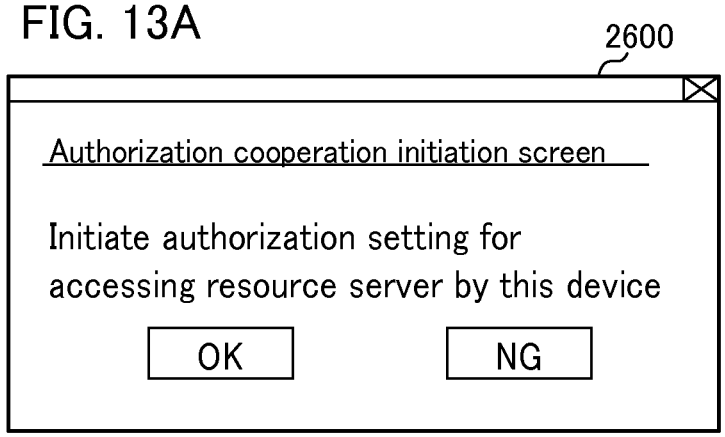
FIG. 13A to FIG. 13C are examples of user authorization screens.

Next, the user executes the browser 830 by operating the image forming device 300. Then, the user accesses an authorization URL for initiating authorization cooperation by the authorization server cooperation unit 870 by operating the browser 830 (S513). The authorization server cooperation unit 870 may be configured to pass a screen 2600 for confirming authorization cooperation initiation as shown in FIG. 13A.

Upon receiving a request for the authorization cooperation initiation, the authorization server cooperation unit 870 acquires the login context from the local login unit 850 (S514). Then the authorization server cooperation unit 870 requests a redirect, to the browser 830, to make an OAuth authorization request to a URL described in the end point URL 1703 in the device management table 1700 (S515). Information for the device ID 1701 and the redirect URL 1706 in the device management table 1700 are included in this authorization request. In OAuth, the scope indicating desired authorization authority scope can be configured to be included in the authorization request. In this embodiment, a description will be given of a case where "authentication printing" is requested as the scope.

Figure 13B:
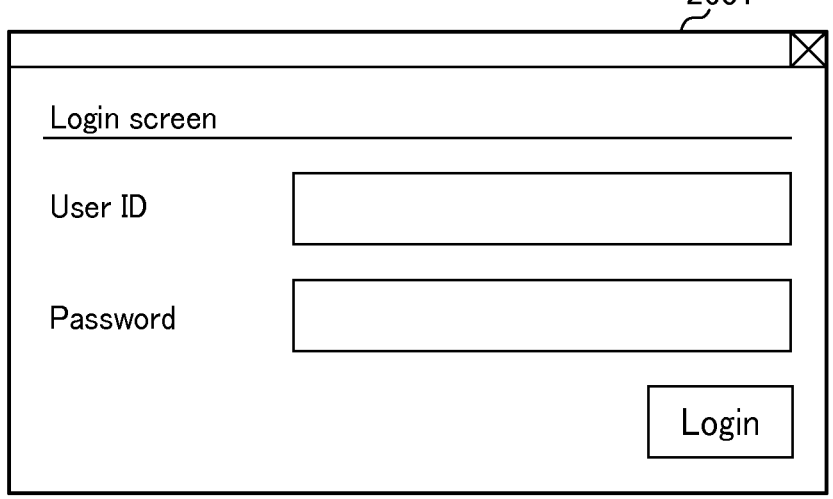
Figure 13C:
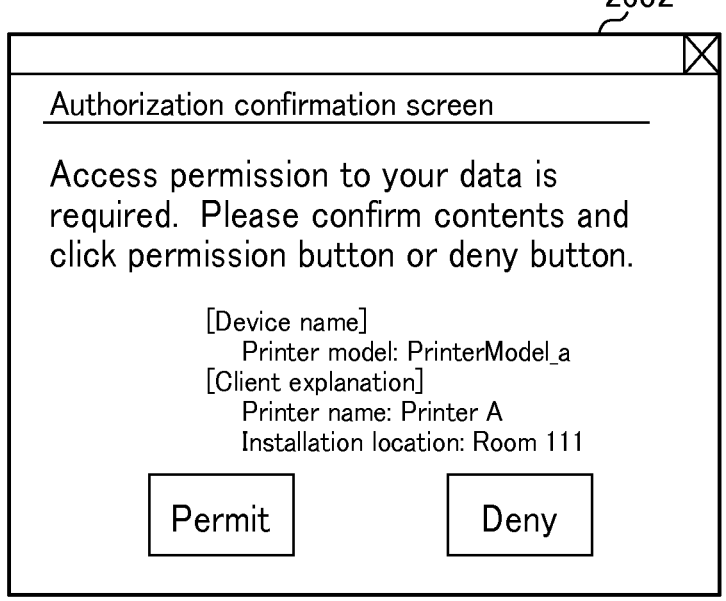

The authorization server 200 that has accepted the authorization request from the Web browser 830 in S515 passes a login screen 2601 for authenticating the user shown in FIG. 13B to the browser 830 as a response (S516). The user inputs a user ID and a password to the login screen 2601 displayed by the browser 830 so as to execute login (S517). The authorization server 200 verifies whether the accepted pair of the user ID and the password is consistent with information registered in the user management table 1300, generates authentication information associated with the user ID when the pair consists with the information, and executes the following processing.

The authorization server 200 verifies whether the pair of the device ID 1701 and the redirect URL 1706 contained in the authorization request is consistent with information registered in the device management table 1400. When the verification result is valid, the authorization server 200 acquires the device name 1402 and the device explanation 1403 in the device management table 1400, generates an authorization confirmation screen 2602 shown in FIG. 13C, and passes it to the browser 830 as a response (S518). In the response to the browser 830, the authorization server 200 stores authentication information as Cookie information. Although a description is given in which the device name 1302 and the device explanation 1403 are displayed on the authorization confirmation screen 2602, a configuration may be employed in which information for the user who logs into the browser is displayed. Also, in the case where the scope is included in the authorization request, the authorization confirmation screen 2602 may be configured to display information explaining a range of that scope.

Next, the user presses a permission button on the authorization confirmation screen 2602 displayed on the browser 830 (S519). The authorization server 200 that accepted the permission executes the following processing. The authorization server 200 issues and registers an authorization code in the authorization token table 1500. At this time, the authorization server 200 registers the issued authorization token ID with the authorization token ID 1501, the issued authorization code with the token type 1502, the issued expiration date 1503, as well as registering the device ID with the device ID 1507, and the user ID 1508 of the login user accepted upon the authorization request. Then, the authorization server 200 requests a redirect to the browser 830 using a redirect URL to which the authorization token ID 1501 and the token type 1502 (the authorization code) are added as an authorization response.

The authorization server cooperation unit 870 that accepted the authorization response from the browser 830 by redirect in S520 makes a token request to the authorization server 200 (S521). The authorization token ID 1501, the token type 1502 (the authorization code), the device ID 1701 in the device management table 1700, and the redirect URL 1706 are included in the token request.

The authorization server 200 that accepted the token request performs the following verification, and generates a parent token if the verification is valid (S522). The authorization server 200 verifies whether the pair of the device ID and the device secret accepted in the token request is consistent with the pair of the user ID 1301 and the password 1302 registered in the user management table 1300. Next, the authorization server 200 verifies whether the authorization token ID 1501 and the token type 1502 (the authorization code) accepted in the token request are registered in the authorization token table 1500, and the expiration date is within the expiration date. Then, the authorization server 200 verifies whether the device ID and the redirect URL accepted in the token request are respectively consistent with the device ID 1507 and the redirect URL 1404 specified by the authorization token ID in the authorization token table 1500. If all the verifications are valid, the authorization server 200 generates the parent token, and passes the authorization token ID 1501 of the parent token to the authorization server cooperation unit 870 as a response. At this time, a refresh token ID 1505 simultaneously issued is included in the response (S523).

With respect to the parent token, the authorization server 200 registers the issued token ID with the authorization token ID 1501, the issued parent token with the token type 1502, the issued expiration date 1503, as well as registering the device ID 1507 and the user ID 1508 from the authorization code as handover information. At this time, the authorization server 200 issues a refresh token for refreshing the parent token, and registers it with the refresh token ID 1505 and the refresh time limit 1506. A flow for refreshing the parent token will be described below.

The authorization server cooperation unit 870 that acquired the authorization token ID and the refresh token ID of the parent token retrieves a device user ID from the login context acquired from the local login unit 850 in S524. Then, the authorization server cooperation unit 870 saves the device user ID, the authorization token ID of the parent token, and the refresh token ID in the parent token management table 1800 (S524). Then, the authorization server cooperation unit 870 passes, to the browser 830, a screen indicating an authorization cooperation completion (not shown) as a response, and ends the processing (S525).

<Authentication Printing>

FIG. 14 is a sequence for authentication printing in which a user executes login on an operation screen of the image forming device 300 and prints a document stored by the print server 210 using an authentication printing unit 880 that is an authentication application. Note that implementation completion of the authority transfer of a user is required in the aforementioned authentication printing.

Firstly, the user logs into the image forming device 300 using a login means provided by the local login unit 850 via the input screen on the image forming device 300 (S611). Here, assume that the user who has a user ID representing user001 logs into the image forming device 300. Then, the local login unit 850 generates a login context including user001, and stores it in the RAM 308 via the application management framework 800 so that each application acquires the login context (S612). Note that if this processing is sequentially executed after the aforementioned parent token acquisition sequence, there is no need for repetitive login and the operation sequence from S613 is performed.

Next, the user access a document list screen (not shown) of the authentication printing unit 880 by operating the image forming device 300 (S613). This operation is for requiring an operation screen for selecting a document stored by the print server 210 and instructing printing.

The authentication printing unit 880 accesses the document list screen 2504 to acquire the login context from the local login unit 850 (S614). Then, the authentication printing unit 880 makes a token acquisition request to the authorization server cooperation unit 870 (S615). At this time, the authentication printing unit 880 includes the login context acquired in S614 in the token acquisition request. The request may be configured to request the scope required for the token. In the present embodiment, a description will be given assuming that "authentication printing" is required in the scope.

Next, the authorization server cooperation unit 870 acquires the refresh token ID 1803 from the parent token management table 1800 taking a device user ID associated with the login context as a key. At this time, the authorization server cooperation unit 870 may be configured to display a screen (not shown) for urging the user to implement the parent token acquisition sequence when no user ID is registered in the parent token management table 1800. Otherwise, the authorization server cooperation unit 870 may be configured to activate the browser 830, and automatically initiate the parent token acquisition sequence in some instances.

The authorization server cooperation unit 870 makes a token refresh request to the authorization server 200 using the acquired refresh token ID 1803, and the device ID 1701 and the device secret 1702 in the device management table 1700 (S616). When the pertinent token is within the expiration date of the parent token, the authorization server cooperation unit 870 may make a child token acquisition request in S620 without the token refresh request.

The authorization server 200 that accepted the token refresh request executes the following processing. Firstly, the authorization server 200 verifies whether the pair of the device ID and the device secret included in the token refresh request is consistent with the pair of the user ID 1301 and the password 1302 in the user management table 1300. When the verification result is valid, the authorization server 200 confirms whether the refresh token ID is registered in the authorization token table 1500, and the pertinent token is within a refresh time limit.

Further, the authorization server 200 confirms whether the device ID included in the token refresh request is consistent with the device ID 1507. All the verification is valid, the authorization server 200 reissues the authorization token ID and the refresh token ID of the parent token (S617) and passes them to the authorization server cooperation unit 870 as a response (S618). As the refresh method, the authorization server 200 issues a new authorization token ID and a refresh token ID, and registers them with the authorization token table 1500. At this time, the token type 1502, the scope 1504, the device ID 1507, and the user ID 1508 in the record specified by the refresh token ID accepted in the token refresh request are handed over. After the handover, the original refresh token ID may be configured to be disabled so that the original refresh token is not refreshed, specifically, the expiration date may be configured to be forcibly expired, or configured to hand over the refresh token ID without issuing a new one.

The authorization server cooperation unit 870 that acquired the refreshed parent token overwrites information in the parent token management table 1800 with the accepted authorization token ID and refresh token ID, and reregisters the information (S619). Then, the authorization server cooperation unit 870 makes a child token acquisition request to the authorization server 200 using the authorization token ID of the parent token, the device ID and the device secret in the device management table 1700, and the scope accepted in the token acquisition request (S620).

The authorization server 200 that accepted the child token acquisition request executes the following processing. Firstly, the authorization server 200 verifies whether the pair of the device ID and the device secret included in the child token acquisition request are consistent with the pair of the user ID 1301 and the password 1302 in the user management table 1300. When the verification is valid, the authorization server 200 verifies whether the authorization token ID included in the child token acquisition request is registered in the authorization token table 1500, and within the expiration date.

Further, the authorization server 200 verifies whether the device ID included in the child token acquisition request is consistent with the device ID 1507. When all the verification is valid, the authorization server 200 generates a child token in S621, and passes it to the authorization server cooperation unit 870 as a response (S622). Similar to the first embodiment, the authorization server 200 newly issues the authorization token ID about the child token. The authorization server 200 registers the child token with the token type 1502 as well as registering the scope included in the child token acquisition request with the scope 1504 in the authorization token table 1500. At this time, the device ID 1507 and the user ID 1508 in the record specified by the authorization token ID accepted in the child token acquisition request are handed over. As a result, the user ID for specifying the user, and the device ID for specifying the image forming device are associated with the issued child token. In contrast with the expiration date 1503 in the first embodiment, a shorter time limit such as one hour or the like may be set to the expiration date. Since there is the case where printer information may not be registered with the print server by an administrator user, this is desirable for ensuring a security by not retaining a token for a long time.

Then, the authorization server cooperation unit 870 that acquired the authorization token ID of the child token passes it to the authentication printing unit 880 that is a request source as a response. The authentication printing unit 880 that acquired the authorization token ID of the child token requests a document list including the authorization token ID to the print server 210 (S623). That is, the authentication printing unit 880 accepts the authority transfer from the user, acquires the authorization information from the authorization server in response to the operation for requiring the operation screen by the user, and transmits the authorization information and the request for obtaining the service authorization information to the print server 210. The print server 210 requests the authorization server 200 for request verification processing of the authorization token ID of the child token included in the document list acquisition request (S624). The print request verification will be described below with reference to FIG. 15.

The authentication printing unit 880 receives a document list from the print server in S625, and generates a document list screen based on the received document list, and displays it (S626). The document list screen displayed here is similar to the document list screen 2504 of the web browser shown in FIG. 9C. When the print button is pressed on the document list screen by the user (S627), the authentication printing unit 880 makes a print request including the authorization token ID in the child token, the document ID, and the printer information to the print server 210 (S628). The document ID added to the print request is the document ID of the document selected by the user on the document list screen. Also, the printer information added to the printer request includes the model name 1901, the URL, 1902, and the serial number 1903 acquired from the printer information table 1900 by the authentication printing unit 880. The print server 210 that accepted the print request performs printer request verification (S629). The details of the print request verification will be described below.

In S630 to S636, the print server 210 generates a print job from the print request, and the authentication printing unit 880 makes a print request to the pull printing unit 860. This flow corresponds to the script processing in S24 to S29 shown in FIG. 8 in the first embodiment, but the authentication printing unit 880 deals with the processing here. The processing in S24 to S29 shown in FIG. 8 in the first embodiment has been explained, and thus, details in S630 to S636 are omitted. In S637, the authentication printing unit 880 generates and displays a print request completion screen (not shown) after the print request is completed.

<Print Request Verification in Authentication Printing>

Figure 15:
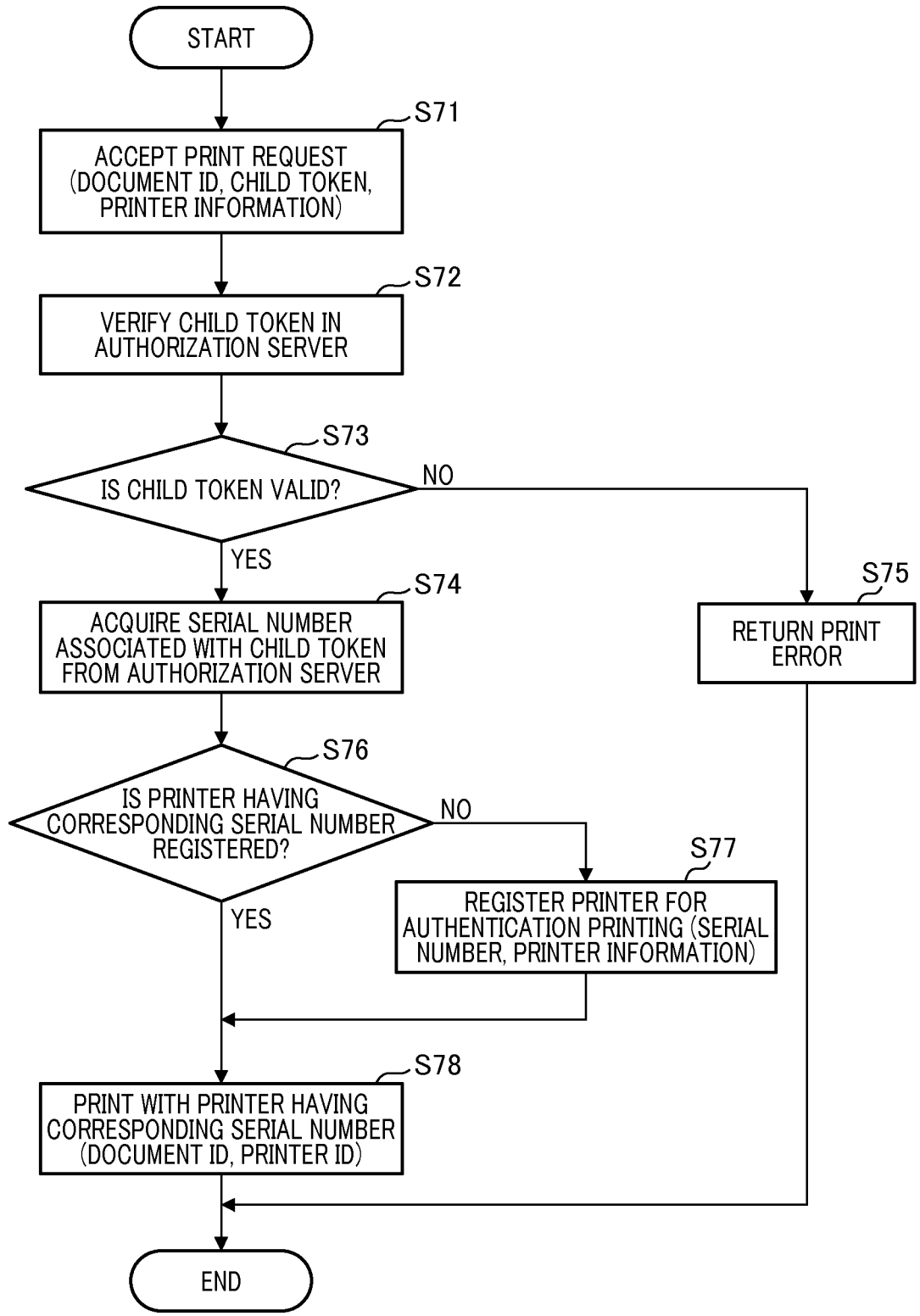
FIG. 15 is a print request confirmation flow for authentication printing.

FIG. 15 is a processing flow in which the print server 210 verifies the print request from the authentication printing unit 880 in S624 shown in FIG. 14. The print server 210 executes the following processing when verifying the print request in S629. When accepting a print request including the document ID, the child token, and the printer information (the model name 1901, the URL 1902, and the serial number 1903) (S71), the print server first makes a child token verification request to the authorization server 200 (S72). In S72, the authorization server 200 that accepted the child token verification request verifies whether the authorization token ID in the accepted child token has been registered in the authorization token table 1500, and within the expiration date, and passes a verification processing result to the print server 210 as a response.

When the verification result indicates that the child token is invalid in S73, the print server 210 passes a print error to the authentication printing unit 880 in S75. When the verification result indicates that the child token is valid, the print server 210 requests the authorization server 200 for a scope and a serial number associated with the authorization token ID in the child token (S74). The authorization server 200 acquires the scope 1504 specified by the authorization token ID in the child token from the authorization token table 1500 and the serial number 1405 associated with the device ID (1401 and 1507), and passes them to the print server 210 as a response. The print server 210 confirms whether the scope acquired from the authorization server 200 is "authentication printing". The print server 210 also confirms whether a printer having the serial number 1405 corresponding to serial number acquired from the authorization server 200 exists in the printer management table 2400 (S76).

When no printer is registered in S76, the print server 210 temporarily registers a printer for authentication printing with the printer management table 2400 in S77. Here, the print server 210 issues/saves the printer ID 2401 of the printer to be registered. The printer information accepted in S71 is saved in the model name 2403, the URL 2404, and the serial number 2405. Also, "authentication printing" is saved in the type 2406 as the printer for authentication printing. Then, the printer with which the serial number is consistent with S76 or the printer registered in S77 executes printing (S78).

In the case of authentication printing, the printer may not be registered with the print server 210. Since printer registration with the print server 210 is not performed, the token verification in the print data acquisition request (S45 and S46) in the first embodiment cannot be performed. Thus, the print server 210 registers, upon accepting the print request, the printer for authentication printing using the serial number associated with the authorization token generated when the user transfers the authority in the authentication printing (S77). Even if the printer is not registered with the print server, the printer for authentication printing is registered, so that the token verification in the print data acquisition request is enabled. A record example registered in the printer management table 2400 is a record "pri000004". At this point, the processing similar to the printer registration in S15 described with reference to FIG. 7 is completed. Then, the print server 210 registers the print job with the job management table 2200 in S630, and performs the processing to the processing in S637.

<Print Data Acquisition Request Verification>

The print data acquisition request verification is the same as that described above in the first embodiment. In the processing flow by the print server 210 in S45 (of FIG. 11), a printer with which the device ID and the printer ID are consistent become the printer temporarily registered in S77 of FIG. 15 (of which the type 2406 represents "authentication printing").

<Print Completion Notification>

FIG. 16 is a processing flow when the print server 210 accepts a print result notification from the pull printing unit 860. Firstly, the print server 210 receives a device job ID for which printing has been completed and its print result in the print result notification (S81). Then, the print server 210 searches for a job for which the printer ID and the job device job ID received in the print result notification correspond from the job management table 2200, and updates a status with the print result (S82). When the print result notification indicates print completion, the print server 210 updates the status 2203 to "printed", whereas the print result notification indicates an error, the print server 210 updates the status 2203 to "error termination".

Next, the print server 210 searches for a printer corresponding to the printer ID received in the print result notification from the printer management table, and confirms whether the type 2406 is "authentication printing" (S83). When the type 2406 of the printer is "authentication printing", the print server 210 confirms whether a job that is currently printing corresponds to the printer ID received in the print result notification and for which the print result is not saved in the job management table 2200 exists (S84). When no job that is currently printing and corresponds to the printer ID received in the print result notification exists, the print server 210 deletes the printer corresponding to the printer ID received in the print result notification from the printer management table 2400 (S85).

The printer for authentication printing is registered when the print server 210 accepts the print request but is not required after print completion. Also, since the registered printer for authentication printing is a printer registered by the user who has an administrator authority, it is undesirable for security to keep the registration state. Hence, when no job printed with the printer for authentication printing upon receiving the print result notification by the print server 210 exists, the print server 210 deletes the printer having no job printed with the printer for authentication printing. This also enables reduction of unnecessary resources (S83 and S84).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127916, filed Jun. 18, 2013 which is hereby incorporated by reference herein in its entirety.

What is claimed is:

1. An authentication system that includes a service provision device that provides a service and an authorization service device that manages authorization information used for providing the service by the service provision device without requiring authentication information, comprising:
   a registering unit configured to register, with the service provision device, identification information for information processing device that cooperates with the authentication system;
   a saving unit configured to associate the identification information for the information processing device with authorization information in accordance with an issuance of the authorization information corresponding to the information processing device, and save them in the authorization service device;
   a querying unit configured to query the authorization service device for the identification information for the information processing device associated with the authorization information in response to a request for obtaining the service and the issued authorization information from the information processing device; and
   a providing unit configured to provide, according to the request, the service with the information processing device in response to a correspondence between the identification information for the information processing device acquired as a result of the query by the query unit and the identification information for the information processing device registered by the registration unit.

2. The authentication system according to claim 1, wherein the registration of the identification information for the information processing device is executed through an operation screen provided on a user device having an administrator authority for the information processing device or the pertinent information processing device.

3. The authentication system according to claim 2, wherein the information processing device comprises:
   a request unit configured to acquire the authorization information from the authorization service device upon accepting the request for obtaining the service from the user device, and transmit the authorization information and the request for obtaining the service to the query unit; and
   a transfer unit configured to accept, from the user, a transfer of an authority for performing the request for obtaining the service to the query unit, acquire the authorization information from the authorization service device in response to an operation for requesting the operation screen by the user, and transmit the authorization information and the request for obtaining the service to the query unit.

4. The authentication system according to claim 3, wherein the authorization service device is configured to generate authorization information associated with the user who has performed the operation in response to the request from the transfer unit, and transmit the authorization information to the transfer unit.

5. The authentication system according to claim 4, wherein the transfer unit is configured to request, the query unit, for verification processing for the validity of the authorization information associated with the user acquired from the authorization service device, and display the operation screen when accepting a verification result indicating that the authorization information is valid from the query unit.

6. The authentication system according to claim 3, wherein the registration unit is configured to determine whether the identification information for the information processing device associated with the authorization information acquired from the transfer unit is registered, provide the service with the information processing device when the identification information for the information processing device is registered, and temporarily register the identification information for the information processing device when the identification information for the information processing device is not registered.

7. The authentication system according to claim 6, wherein the registration unit deletes identification information for the temporarily registered information processing device when the information processing device completes processing execution according to the provided service.

8. The authentication system according to claim 1, wherein, the service provided by the provision unit is for providing a print job, and the information processing device executes print processing based on the provided print job.

9. The authentication system according to claim 8, wherein the operation screen is a selection screen for the document to be printed.

10. A control method for an authentication system that includes a service provision device that provides a service and an authorization service device that manages authorization information used for providing the service by the service provision device without requiring authentication information, comprising:
   registering, with the service provision device, the identification information for an information processing device that cooperates with the authentication system;
   associating the identification information for the information processing device with authorization information in accordance with an issuance of the authorization information corresponding to the information processing device, and saving them in the authorization service device;
   querying, the authorization service device, for the identification information for the information processing device associated with the authorization information in response to a request for obtaining the service and the issued authorization information from the information processing device; and
   providing, according to the request, the service with the information processing device in response to a correspondence between the identification information for the information processing device acquired as a result of the querying and the identification information for the registered information processing device.

11. A service provision device that is communicable with an authorization service device that manages authorization information used for providing the service by the service provision device without requiring authentication information, comprising:
   a registering unit configured to register the identification information for the information processing device that cooperates with the service provision device;
   a querying unit configured to query, the authorization service device, for the identification information for the information processing device associated with the authorization information in response to an acquisition of the request for obtaining the service and the issued authorization information form; and
   a providing unit configured to provide, according to the request, the service with the information processing device according to the request in response to a correspondence between the identification information for the information processing device acquired as a result of the querying and the identification information for the registered information processing device.

12. A non-transitory storage medium on which is stored a computer program for making a computer execute a control method of an authentication system that includes a service provision device that provides a service and an authorization service device that manages authorization information used for providing the service by the service provision device without requiring authentication information, comprising:
   registering, with the service provision device, the identification information for an information processing device that cooperates with the authentication system;
   associating the identification information for the information processing device with authorization information in accordance with an issuance of the authorization information corresponding to the information processing device, and saving them in the authorization service device;
   querying, the authorization service device, for the identification information for the information processing device associated with the authorization information in response to a request for obtaining the service and the issued authorization information from the information processing device; and
   providing, according to the request, the service with the information processing device in response to a correspondence between the identification information for the information processing device acquired as a result of the querying and the identification information for the registered information processing device.

* * * * *